(12) United States Patent
Elaasar

(10) Patent No.: US 8,010,938 B2
(45) Date of Patent: *Aug. 30, 2011

(54) COMPUTER METHOD AND SYSTEM FOR PATTERN SPECIFICATION USING META-MODEL OF A TARGET DOMAIN

(75) Inventor: Maged E. Elaasar, Kanata (CA)

(73) Assignee: International Business Machines Corporation, Armonk, NY (US)

( * ) Notice: Subject to any disclaimer, the term of this patent is extended or adjusted under 35 U.S.C. 154(b) by 1177 days.

This patent is subject to a terminal disclaimer.

(21) Appl. No.: 11/563,346

(22) Filed: Nov. 27, 2006

(65) Prior Publication Data

US 2008/0127049 A1    May 29, 2008

(51) Int. Cl.
*G06F 9/44* (2006.01)
(52) U.S. Cl. ........ 717/104; 717/107; 717/108; 717/116; 717/121
(58) Field of Classification Search .................. None
See application file for complete search history.

(56) References Cited

U.S. PATENT DOCUMENTS

| | | | |
|---|---|---|---|
| 6,651,240 B1 | 11/2003 | Yamamoto et al. | |
| 6,678,882 B1* | 1/2004 | Hurley et al. | 717/121 |
| 6,851,105 B1 | 2/2005 | Coad et al. | |
| 6,904,588 B2 | 6/2005 | Reddy et al. | |
| 6,931,625 B1 | 8/2005 | Coad et al. | |
| 7,349,913 B2* | 3/2008 | Clark et al. | 1/1 |
| 7,478,362 B2* | 1/2009 | Gutz et al. | 717/104 |
| 7,533,365 B1* | 5/2009 | Hogstrom et al. | 717/105 |
| 7,698,695 B2* | 4/2010 | Ganesh et al. | 717/143 |
| 7,814,427 B2* | 10/2010 | Cook et al. | 715/763 |
| 7,827,524 B2* | 11/2010 | Wilson et al. | 717/108 |
| 2002/0104068 A1* | 8/2002 | Barrett et al. | 717/104 |
| 2004/0153992 A1* | 8/2004 | Molina-Moreno et al. | 717/105 |
| 2005/0050537 A1* | 3/2005 | Thompson et al. | 717/165 |
| 2005/0125769 A1* | 6/2005 | McGovern et al. | 717/102 |
| 2005/0125772 A1 | 6/2005 | Kohno | |
| 2005/0132342 A1 | 6/2005 | Van Lunteren | |
| 2005/0166193 A1 | 7/2005 | Smith et al. | |
| 2005/0198616 A1 | 9/2005 | Uehara et al. | |
| 2005/0278692 A1* | 12/2005 | Sridhar et al. | 717/106 |
| 2005/0278709 A1* | 12/2005 | Sridhar et al. | 717/136 |
| 2006/0101376 A1* | 5/2006 | Gutz et al. | 717/104 |
| 2006/0117037 A1* | 6/2006 | Gutz et al. | 707/100 |
| 2006/0129974 A1* | 6/2006 | Brendle et al. | 717/108 |

(Continued)

OTHER PUBLICATIONS

Title: A formal basis for object-oriented patterns, author:Cechich, A.; Moore, R.; source: IEEE, dated: Dec. 7, 1999.*
Title: Classifying relationships between object-oriented design patterns, author: Noble, J, source: IEEE, dated: Nov. 9, 1998.*

(Continued)

*Primary Examiner* — Chameli C Das
(74) *Attorney, Agent, or Firm* — Hamilton, Brook, Smith & Reynolds, P.C.

(57) ABSTRACT

Computer method and apparatus for providing pattern specification especially in computer software program modeling is disclosed. The invention method and apparatus defines patterns as a meta-class in a target domain. Each pattern has one or more pattern roles. The method and apparatus defines pattern roles as meta-properties and specifies one or more constraints between pattern roles in the context of the pattern meta-class. One or more connectors are used between meta-properties to represent relationships between pattern roles. One or more associations are used for representing high level relationships between pattern roles in a manner simplifying pattern specification.

20 Claims, 14 Drawing Sheets

U.S. PATENT DOCUMENTS

| | | | |
|---|---|---|---|
| 2006/0184995 A1* | 8/2006 | Backes et al. | 726/1 |
| 2007/0180424 A1* | 8/2007 | Kazakov et al. | 717/104 |
| 2007/0256051 A1* | 11/2007 | Rojer | 717/104 |
| 2008/0010629 A1* | 1/2008 | Berg et al. | 717/116 |
| 2009/0007059 A1* | 1/2009 | Gutz et al. | 717/104 |
| 2010/0235844 A1* | 9/2010 | Arwe et al. | 718/104 |

OTHER PUBLICATIONS

Title: Specifying conceptual interface patterns in an object-oriented method with automatic code generation, author: Molina et al, source: IEEE, dated: Aug. 7, 2002.*

* cited by examiner

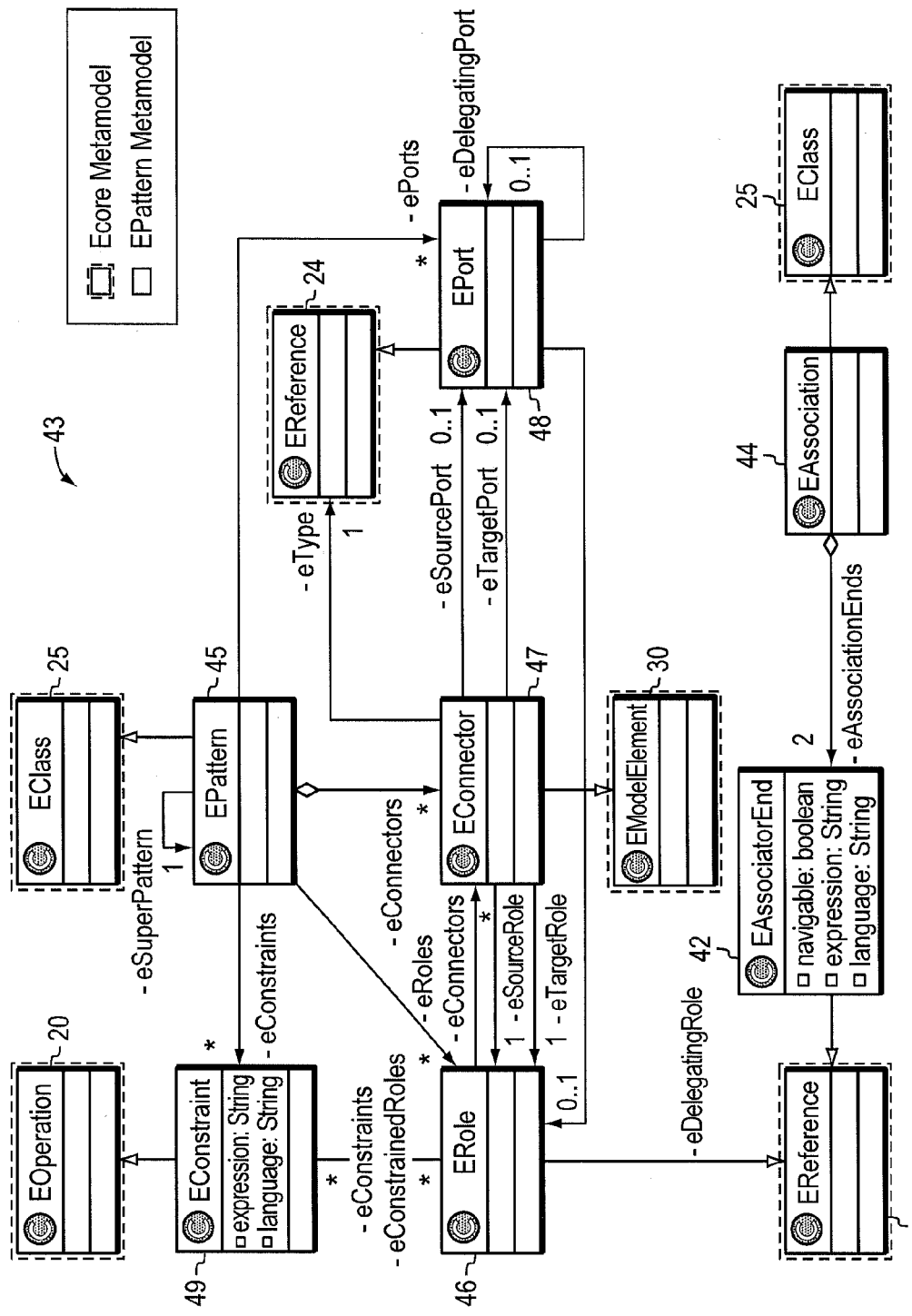
FIG. 4B  THE EPATTERN METAMODEL

EPATTERN SPECIFICATION
FOR COMPOSITE PATTERN

SIMPLIFIED EPATTERN SPECIFICATION
FOR COMPOSITE PATTERN

COMPUTER METHOD AND SYSTEM FOR PATTERN SPECIFICATION USING META-MODEL OF A TARGET DOMAIN

BACKGROUND OF THE INVENTION

Model driven architecture (MDA) is an approach to system development advocated by the Object Management Group (OMG). The approach starts by describing the system's specifications using a platform independent model (PIM). A PIM is usually specified in a language that is based on the Meta Object Facility (MOF), a standard by the OMG for describing modeling languages. A prominent example of such languages is the Unified Modeling Language (UML), which is well adopted by the software engineering community. Alternatives to UML also exist and are collectively referred to as Domain Specific Modeling Languages (DSML) (Magyari, E. et. al., "UDM: An Infrastructure for Implementing Domain-Specific Modeling Languages," 3rd OOPSLA. Workshop on Domain-Specific Modeling, OOPSLA '03), as they are more specialized and target certain modeling domains. Once a system has been specified using a PIM, a platform is then chosen to enable the realization of the system using specific implementation technologies, producing what is referred to as a platform specific model (PSM).

In spite of the potential benefits of MDA including reduced development time for new applications, improved application quality, quicker adoption of new technologies into existing application and increased return on technology investment, the adoption of MDA has not picked up to its full potential yet. One reason for this is the complexity problems inherent in today's MDA tools. These tools usually appeal to the MDA savvy but fall short of meeting the expectations of the mainstream practitioners who are competent with their technologies but not necessarily with MDA. Another reason is the limited support available to the user beyond authoring their models. For instance, features that help the user inspect the quality of their models are lacking in many major MDA tools.

As system models get larger and more complex, the task of inspecting their quality becomes much harder. It is now well understood that a problem detected early on in the system development life cycle is much cheaper to tackle than one discovered later on. Hence, technologies that facilitate inspecting models for quality purposes can certainly play a big role in enhancing the value of MDA. Examples of these technologies include architectural discovery (Booch, G., *Handbook of Software Architecture*, at www.booch.com/architecture/), anti-pattern detection (Brown, W. et al., *Antipatterns: Refactoring Software, Architectures, and Projects in Crisis*, John Wiley & Sons, 1998) and consistency analysis (Engels, G. et al., "Consistent Interaction of Software Components," in *Proceedings of Integrated Design and Process Technology*, 2002). Equally important are those technologies that assure the quality of the process of going from PIM to PSM. Examples here include impact analysis (Briand, L. et al., "Automated Impact Analysis of UML Models, *Journal of Systems and Software*, 79(3):339-352, March 2006).

One way to analyze the quality of user models is to look for instances of predefined patterns. Patterns are recurring modeling structures that are either desirable or undesirable (see Brown above). Desirable patterns represent elements of reuse at a higher level of abstraction. Therefore, trying to understand a model by its usage of patterns helps by raising the level of abstraction. Conformance to desirable patterns is expected to boost the quality of models by expediting modeling of maintainable and robust designs. On the other hand, the early identification of undesired patterns, or anti-patterns, protects against making common and expensive design mistakes. It is also a first step towards the mitigation of existing design problems.

Support of patterns has started to show up in some major modeling tools like RSA (IBM Rational Software Architect, at www-128.ibm.com/developerworks/rational/products/rsa/). One common requirement is the definition of a formalism that is used to specify patterns for tool consumption. The state of the art in this area is far yet from converging on a standard for pattern specification.

Pattern specification is a common denominator to most work in applied pattern research. Various approaches have been proposed for pattern specification (Baroni, A. et al., "Design Patterns Formalization", *Ecole Notionale Superieure des Techniques Industrielles, Research Report 03/3/INFO*, 2003 and Technical Report 2002). One category of approaches, that Applicant's work also belongs to, uses meta-modeling techniques. The work presented in Guennee, A. et al., "Precise Modeling of Design Patterns," *Proceedings of UML* 2000, Vol. 1939 of LNCS, pp. 482-496, Springer Verlag 2000 and Mark, J. "Precise Modeling of Design Patterns in UML," in *Proceedings of the 26th International Conference on Software Engineering*, 2004, proposes specifying a pattern as a UML 1.5 meta-collaboration with pattern roles typed with M1 classes stereotyped <<meta>> and named after meta-classes. This obviously prevents writing constraints for such roles as their type information is not available at level M1. Also a new dependency is introduced to describe role bindings as roles are not typed with real meta-classes.

The work in Kim, D., "A UML-Based Metamodeling Language to Specify Design Patterns", in *Proceedings of WiSME, UML Conference*, October 2003, introduces the RBML language, which suggests specifying UML patterns as specialized meta-models that characterize M1 models. Pattern roles get their base types by subclassing meta-classes from the UML meta-model. One problem with specifying a pattern as a meta-model is a lack of a context to the specification. This deprives the specification from OO (object oriented) complexity management features like inheritance and composition. It also forces role binding to be done through mapping, which is not as convenient as the present invention solution.

Restated, Applicant finds that use of domain model data (model objects) instead of meta-data (as in the present invention) to describe a pattern limits the expression of the pattern to the semantics of the domain model. This poses a problem if the domain does not have sufficient semantics to completely specify a pattern. Also, this complicates building domain-independent tools that read and process pattern definitions for the purposes of application or detection.

Another proposal is found in Maplesden, D. et al., "Design Pattern Modelling and Instantiation using DPML," in *Proceedings of Tools Pacific* 2002, p. 18-21, Sydney, Australia, February 2002, where the DPML language is used to visually specify patterns as a collection of participants, dimensions (multiplicities), relationships and constraints. One drawback is the non-standard notation adopted by the language. Another problem is the restriction of the participants and relationships to predefined types from the UML domain, which limits the scope of the patterns definable by the language. Also, there is no mention of complexity management features.

Another approach (Albin-Amiot, H. and Y. G. Gueheneue, "Metamodeling Design Patterns: Application to Pattern Detection and Code Synthesis", in *Proceedings of the ECOOP* 2001 *Workshop on Adaptive Object-Models and MetaModeling Techniques*, 2001) provides a meta-model to specify patterns. This meta-model is first specialized with pattern related concepts before being instantiated to produce an abstract model (pattern specification) which is either instantiated to create a concrete model (pattern instance) or parameterized to use in pattern detection. One major problem with this approach is using non-standard meta-models. Concepts from a target language like UML are added to the pattern meta-model and defined to subclass pattern related meta-classes which implement functionality needed for pattern application and detection. Enough concepts to specify the Gof patterns are defined.

As mentioned above, patterns are recurring design solutions that have been refined over the years by many practitioners to address common design problems. Software development is a typical domain for applying design patterns and the GoF patterns are not but classic examples of these. Patterns are often informally described in the literature for the purpose of education. However, for tools to work with patterns, they need to be formally specified in a machine consumable format.

The previous art in the area of formal pattern specification is rich with various approaches. Some of these approaches leverage known standards like UML, while others come up with new ways to formalize patterns. For example, the current official proposal to represent patterns in UML is to use a parameterized collaboration. The general structure of the pattern is described in terms of classifier roles and association roles that connect them. Every classifier role has an associated base that is defined as a template parameter and is bound to an actual classifier in a given context (so called instance of a pattern). However, modeling patterns as a parameterized collaboration has severe limitations that were identified in Sunye, G. et al., "Design pattern application in UML", in *ECOOP* 2000 *Proceedings*, (E. Bertino, editor) number 1850, pp. 44-62, Lecture Notes in Computer Science, Springer Verlag, June 2000. For example, while pattern roles can have a multiplicity that is greater than one, only one element is allowed to be bound to every template parameter. Another limitation is that types of connectors unlike types of roles cannot be specified as template parameters and are assumed to be deducted automatically. One more limitation is that not every meta-class from UML is allowed to be used as a template parameter, limiting the ability to use these meta-classes as pattern roles.

Other approaches to patter specification also exist. One category of approaches to pattern specification adopted a mathematical notation by defining special kinds of calculus or formulae. Examples of these approaches include LePUS (Eden, H. H. et al., "Le-PUS—A declarative pattern specification language," Technical Report 326/98, Department of Computer Science, Tel Aviv University, 1998) and Toufik (Toufikl, T. and D. Ngo, "Formal Specification of Design Patterns—A Balanced Approach," in *Journal of Object Technology*, 2(4)127-140, July-August 2003). While some of them focused on structural aspects of patterns, others tried to also incorporate behavioral aspects by adding temporal and state-based logic in their formalisms. One major problem with these approaches is the complexity of the notation, which is a major barrier to adoption by average users. Another category of approaches used special non-standard semantics or graphical notations to describe patterns. Examples of these approaches are described by A. Baroni above. Again, these approaches require a steep learning curve due to deviating from standard notations. Another important category of approaches adopted a meta-modeling approach to pattern specification. An example of this approach is the work in France et al. (France, R. B. et al., "A UML-Based Pattern Specification Technique", *IEEE Transactions on Software Engineering*, 30(3)193-206, March 2004). Pattern roles are defined as specializations of meta-classes in the target meta-model. Associations between pattern meta-classes refine some of the associations between the corresponding base meta-classes. Pattern well-formedness rules are expressed with constraints associated with the new meta-classes and behavioral constraints are specified with meta-level behavioral diagrams. One main problem with this approach is a lack of context that binds the new meta-classes together to form a pattern definition, except for being owned by the same meta-model, which limits the reusability of pattern specifications.

Fortunately, the concepts of pattern specification apply not only to UML models but also to other domain specific models and in fact to any data whose structure can be described by a meta-model or a schema. In Eclipse, the EMF framework is used to model structured data by means of specifying an Encore model (basically a UML class diagram) of the entities involved along with their relationships. However, what is needed is a more generic approach to pattern specification; one that leverages and extends the features of EMF to provide a way to manage the complexities and enhance the reusability of pattern specifications.

SUMMARY OF THE INVENTION

The present invention presents a new approach to precise pattern specification within a Pattern Modeling Framework (PMF). PMF uses a declarative and graphical approach to pattern specification, which is based on existing meta-modeling technologies. The invention specification language, called Epattern, allows for the specification of patterns in MOF-compliant modeling languages using an iterative, graphical process. Epattern has inherent capabilities to manage the specification of complex patterns. PMF in one embodiment is implemented as a set of plug-ins to the Eclipse platform and leverages several Eclipse-based open source projects like the Eclipse Modeling Framework (EMF) known in the art.

To summarize the key differences with Applicant's PMF, most of the above approaches lack the ability to specify patterns for languages other than UML or viewpoints other than the class diagram. They also lack features that help alleviate the complexity of pattern specification and typically do not follow properly the recommended strategy of OMG for separating properly the meta-levels, thus leading to unnecessary assumptions and loss of flexibility in expressing the patterns. Another problem is the inability of the prior approaches to give pattern authors the tools to refine patterns in a stepwise manner and explicitly model relationships among patterns (e.g., through inheritance and composition).

In a preferred embodiment, the new semantics of UML2, more specifically those of the composite structure diagram, are used to formally specify patterns in any EMF-based model. The invention approach leverages and extends EMF to accomplish that. The Encore model, being a realization of EMOF (an OMG standard), uses the semantics of a UML class diagram to define meta-models for any modeling domain. The present invention suggests extending the Encore model with new semantics, inspired from the UML2 composite structure diagram, creating a new model called Epattern, to be used specifically for modeling patterns in Encore-based models.

In Epattern, various concepts from Encore are specialized for the domain of pattern modeling while some new ones are introduced. More specifically, a pattern is modeled as a class, its roles as properties of the class, the relationships between these roles as connectors between the properties, and the pattern well-formedness rules as constraints attached to these roles. In addition, these classes define ports to allow for pattern reuse. Other new concepts include associations (and ends of the associations) to allow for hiding the complexity of relationships in the target domain.

Advantages of this approach to pattern modeling include:
1. The Epattern model, being an extension of Ecore, can be used to formally specify patterns in any domain specific model, and is not limited to UML only.
2. The specification can bring together concepts from various meta-models or different views of the same meta-model (e.g., class and sequence diagram) in one pattern specification.
3. The process of pattern modeling is very consistent and familiar to meta-modelers who model with Ecore.
4. A pattern being specified as a class opens the door to all the benefits of object-orientation like inheritance, composition, refinement, genericity . . . etc.
5. The semantics of Epattern being borrowed from a standard like UML2 carries with it all the benefits and guarantees of best practices and solid architecture.
6. The resemblance of Epattern semantics to those of UML2 has an advantage on tooling since the specification can be authored in UML2 using UML2 tools then converted to Epattern. The present invention defines a pattern as an object-oriented model in a manner that enables interpretation and manipulation by tools.

The present invention is not limited to patterns in software or UML2 but to may target domain that can be structurally described by a meta-model (e.g., business process modeling, data modeling, CAD modeling, etc.)

In a preferred embodiment, a computer method and apparatus of the present invention provides pattern specification in computer software program modeling and other meta-modeling systems. The invention method/apparatus includes (a) a method step or means for defining patterns as a class in a meta-model of a target of domain, each pattern having one or more roles, and (b) a method step of means for modeling pattern roles as properties of the class. The invention method/apparatus further employs any combination of method steps or means for:

modeling relationships between pattern roles as connectors between respective properties;

specifying constraints between pattern roles, in the context of the pattern class; and/or simplifying pattern specification by utilizing one or more associations for representing high level relationships between pattern roles.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 4a and 4b are schematic views of the Epattern model and the Epattern meta-model, respectively.

DETAILED DESCRIPTION OF THE INVENTION

Figure 1:
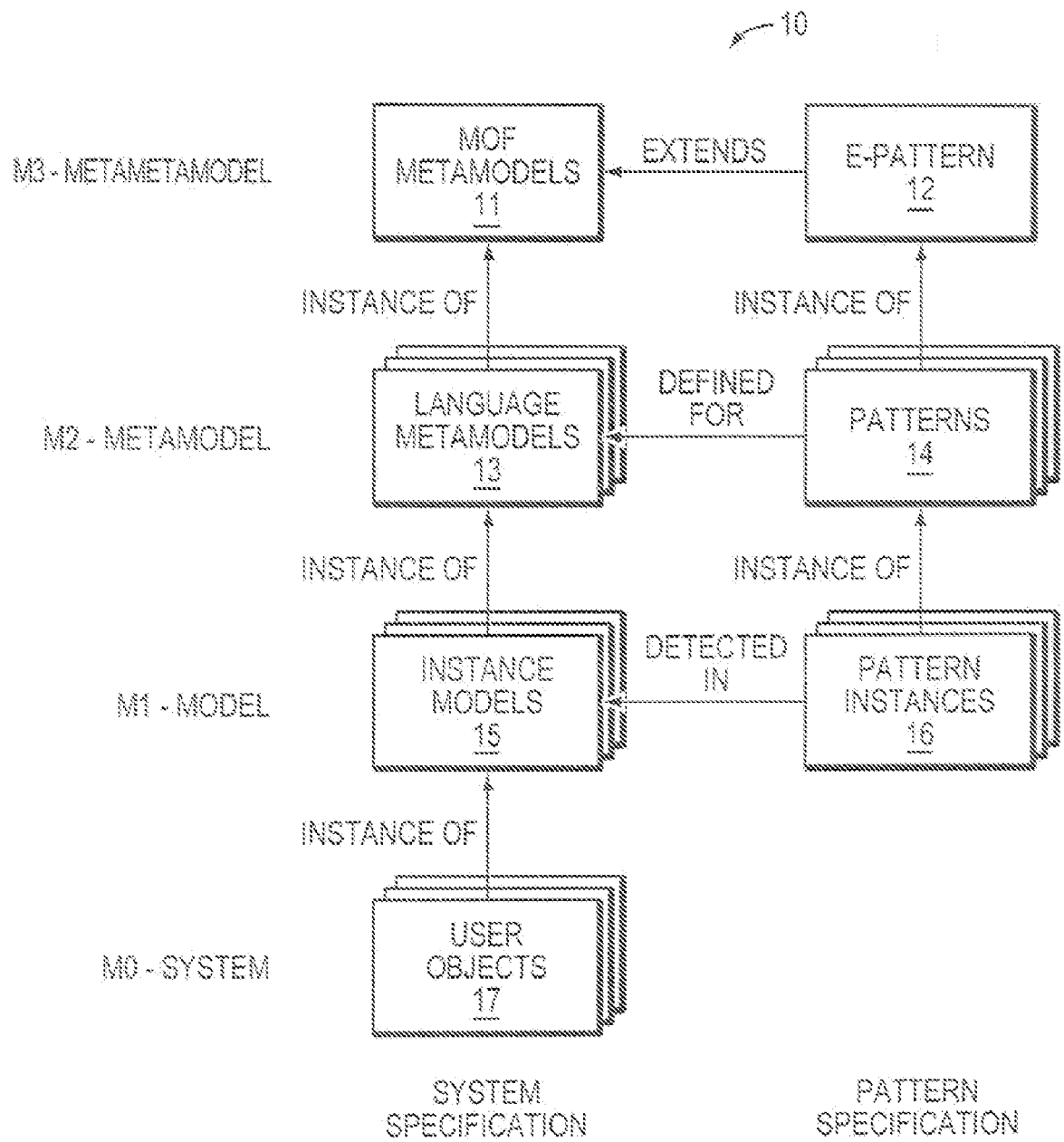
FIG. 1 illustrates pattern specification using OMG's meta-modeling architecture.

The Pattern Modeling Framework (PMF) offers a new approach to pattern specification according to the present invention. As illustrated in FIG. 1, the framework adopts an architecture that is compatible with the OMG's 4-layer meta-modeling architecture. In the meta-modeling architecture, the Meta Object Facility (MOF) M3 level is used to define meta-models 11 for various modeling languages 13 at the M2 level. Instance models 15 at the M1 level that conform to those languages 13 can then be defined. When these user models 15 are deployed, user objects 17 instantiating them are created (M0 level). Along the same lines, PMF 10 defines a pattern specification language 12 as an extension of MOF (M3 level). The new pattern specification language 12 of the present invention is used to specify patterns 14 in any MOF compliant modeling language 13 (M2 level). Pattern instances 16 conforming to those patterns 14 are hence defined in terms of instance models 15 (M1 level). This conformance in architecture gives PMF 10 the advantage of being able to specify patterns 14 on any MOF-compliant modeling language 13 (i.e., not only UML) and even patterns that involve multiple modeling languages and viewpoints at the same time (like patterns specified in terms of both the UML class and interaction diagrams at the same time).

In the present invention, the pattern specification language 12 provided by PMF is called Epattern and is defined as an extension to the MOF 2.0 specification (OMG. MOF Core Specification v.2.0. OMG Document formal/Jun. 1, 2001). The Eclipse Modeling Framework (EMF) provides a platform specific realization of a subset of MOF called EMOF, whose semantics resemble those of simple UML class diagrams. This realization is called Ecore and is integrated with the Eclipse platform. Ecore is widely used today to specify various language meta-models including that of UML 2.0, which is available as an open source project (UML2: EMF-based UML 2.0 Metamodel Implementation at www.eclipse.org/uml2) and used by modern UML tools like RSA and Eclipse UML. EMF provides tooling for specifying Ecore meta-models and generating corresponding java APIs for them. The Epattern language is realized as an extension to Ecore, which gives PMF two advantages: the ability to reuse a lot of the tools provided by EMF and the ability to provide pattern specification capabilities in modern modeling tools.

An Overview of Relevant UML2 Composite Structure Semantics

A composite structure (CS) diagram is basically a view on the internal structure of a structural classifier (e.g., Class, Collaboration . . . etc). In class diagram semantics, a class has a list of properties, operations, signal receptions and template parameters. In composite structure semantics, a class has in addition a list of connectors and ports. Properties of a structured classifier in a CS diagram are called 'roles' (those with aggregation kind set to composite are also called 'parts'). Roles show up as boxes with their name and type in a CS diagram. Connectors are lines connecting roles and semantically indicate how they are inter-related. A connector can be typed with an association, whose name is shown as a connector. Ports, little square shapes that sit at the boundaries of a structure diagram, define access points to the structured classifier roles. A port, can be delegating in or out of a classifier and typed with types that are conformant to the types of roles it is delegating to or from within the classifier. Roles can also be constrained by constraints defined in the context of the owning class that refer to those roles.

An Overview of Relevant Ecore Semantics

The semantics of Ecore are basically a subset of those of a UML class diagram. An Ecore model is structured into a set of named EPackages that represent unique name spaces. An EPackage can own a set of nested EPackages and a set of EClassifiers. An EClassifier is a named element that can be either an EClass representing a complex type, or an EDataType representing a simple type. The structure of an EClass is specified with a set of EStructuralFeatures, representing the properties of the class, while the behavior of an EClass is specified with a set of EOperations, representing the operations of a class. An EStructuralFeature and an EOperation are named and typed elements. An EStructuralFeature can either be an EAttribute, typed with a simple data type, or an EReference, typed with an EClass, EReferences can represent both containment and non-containment references. An EOperation has a return type and a set of EParameters that are themselves typed and named elements representing the inputs of the operation. An EClass can either represent a class or an interface and can extend off a set of EClasses forming a hierarchy.

The present invention Epattern language 12 contains semantics/constructs that are inspired from similar ones in UML 2.0 composite structure diagrams (CSD) (OMG. UML 2.0 Superstructure Specifications. OMG Document formal/ May 7, 2004) and that are used in Epattern to specify patterns. That is, the Epattern model (FIG. 4a described below) is an extension to the Ecore model that adds the semantics of UML2 structure diagram. CSDs were recently added to UML to depict the internal structure of a classifier (such as a class, a component, or a collaboration), including the interaction points of the classifier to other parts of the system. While class diagrams model a static view of class structures, including their attributes and operations, CSDs model specific usages of these structures. For instance, classes are viewed as parts fulfilling some roles, and roles are interconnected to represent relationships that might or might not be reflected by static diagrams. One known use of CSDs is to describe patterns in UML instance models 15 (M1 level). However, as CSDs are part of the UML 2.0 meta-model 13 (M2 level), they cannot be used to specify general pattern structures involving elements of that same meta-model, or any other M2 meta-model 13. To specify such patterns one needs similar capabilities at level M3. To address this problem the invention Epattern language 12, defined at the M3 level, reuses some of the CSD semantics and applies them to specify patterns in language meta-models 13.

Once patterns 14 are specified in E pattern 12, their specifications can be used to derive various types of algorithms for the purpose of pattern application and detection. The language contains some semantics that can be used by pattern authors to fine tune the generation of these algorithms without affecting the structural definition of patterns. This allows pattern authors to leverage their knowledge of the pattern's target language to make the algorithms more efficient. One type of algorithms, which is detailed in related U.S. patent application Ser. No. 11/565,700, entitled "Configurable Pattern Detection Method and Apparatus" by assignee of the present invention, is a pattern detection algorithm. This algorithm is used to inspect user models for instances 16 of predefined patterns.

Furthermore, PMF includes a graphical, stepwise, and iterative process to guide the user for specifying patterns and alleviate their complexity. Other features of the framework, which are outside the scope of this disclosure include the ability to generate a detection algorithm for each specification and use it to detect and visualize pattern instances in user models.

The Epattern language 12 can be used to formally specify patterns of MOF-compliant modeling languages. As mentioned above, Epattern is designed as an extension to MOF and realized as an extension to Ecore, which includes the concepts necessary to specify meta-models of MOF-compliant languages including UML 2.0 as well as any target domain structurally described by a meta-model. The following description refers to concepts defined by Ecore rather than MOF as a simplification (not a limitation) because the terminology used there is closer to the one for the preferred embodiment of Epattern 12.

Figure 2:
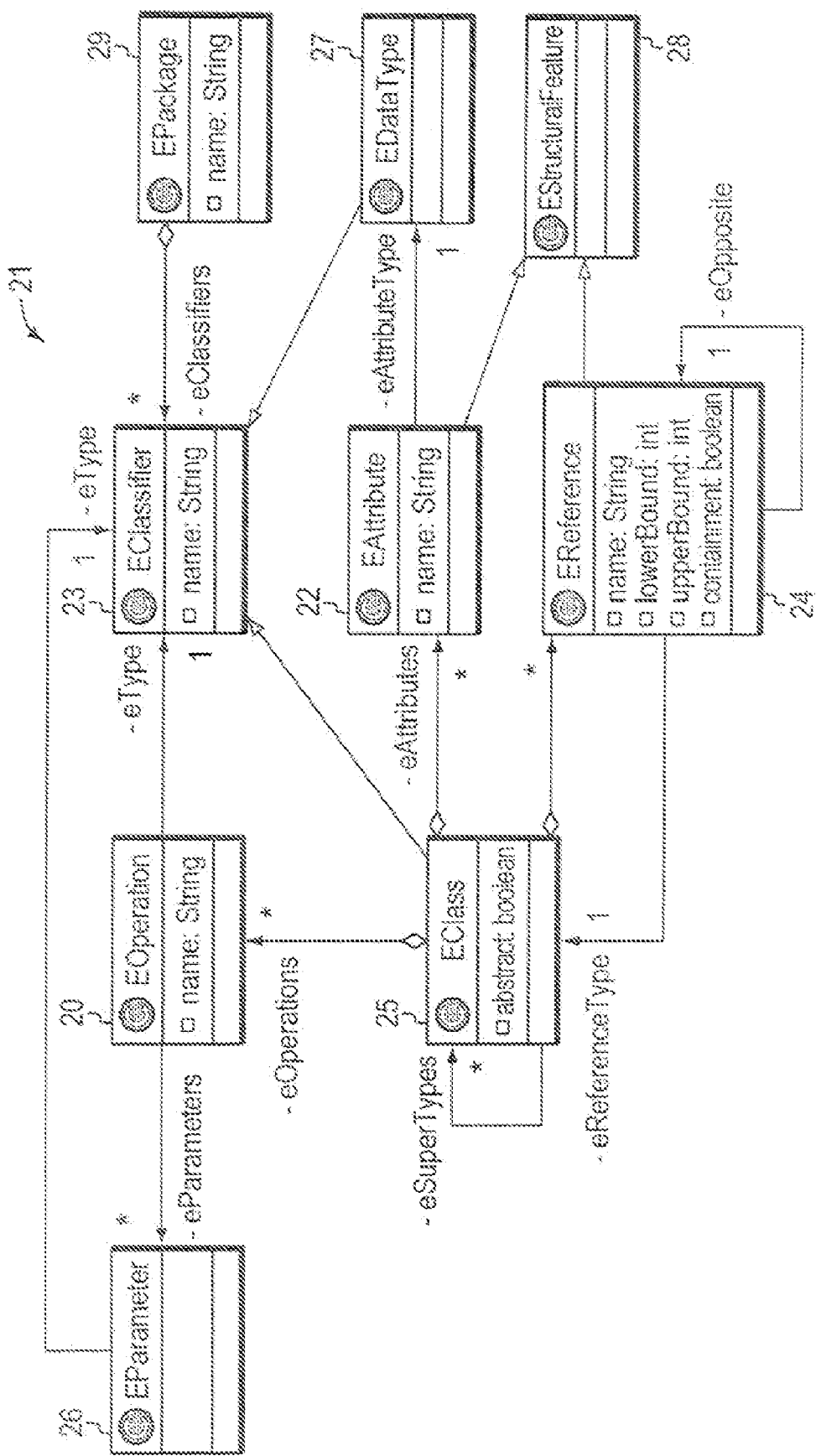
FIG. 2 is a diagram of a simplified Ecore meta-model.

A simplified meta-model 21 of Ecore is shown in FIG. 2. All classes in the ECore meta-model 21 are subclasses of EmodelElement (not shown on the diagram to avoid cluttering). A concept in a modeling language is specified using an EClassifier 23, which is a named element that has two subclasses: an EClass 25 representing a complex type (e.g., 'Property' in UML) and an EDatatype 27 representing a simple type (e.g., 'AggregationKind' in UML). EClassifiers 23 are physically arranged in hierarchical namespaces represented by EPackages 29. EClasses 25 can either represent classes (including abstract ones) or interfaces and may be organized into inheritance hierarchies. The structure of an EClass 25 is specified with a set of EStructuralFeatures 28, representing the properties of a class, while its behavior is specified with a set of EOperations 20, representing the operations of a class. An EStructuralFeature 28 is a named and typed element that has two subclasses: an EAttribute 22, typed with an EData Type 27 (e.g., 'Property.aggregation' in UML), and an EReference 24, typed with an EClass 25 (e.g., 'Property.type' in UML). An EReference 24 can represent either a containment reference, i.e., its value is owned by the class, or a non-containment reference, i.e., its value is referenced by the class. An EReference 24 may also point to an opposite EReference if it represents one end of a bidirectional association between two classes. An EOperation 20 is a named element that has an EClassifier 23 return type. It also has a list of EParameters 26 that are named and typed with EClassifiers 23.

The EPattern 12 language defines semantics for pattern specification that extend off those of Ecore. The following description uses a working example to explain these semantics, illustrates their graphical notation, and describes a recommended process for using them to specify patterns 14.

Working Example

Figure 3:
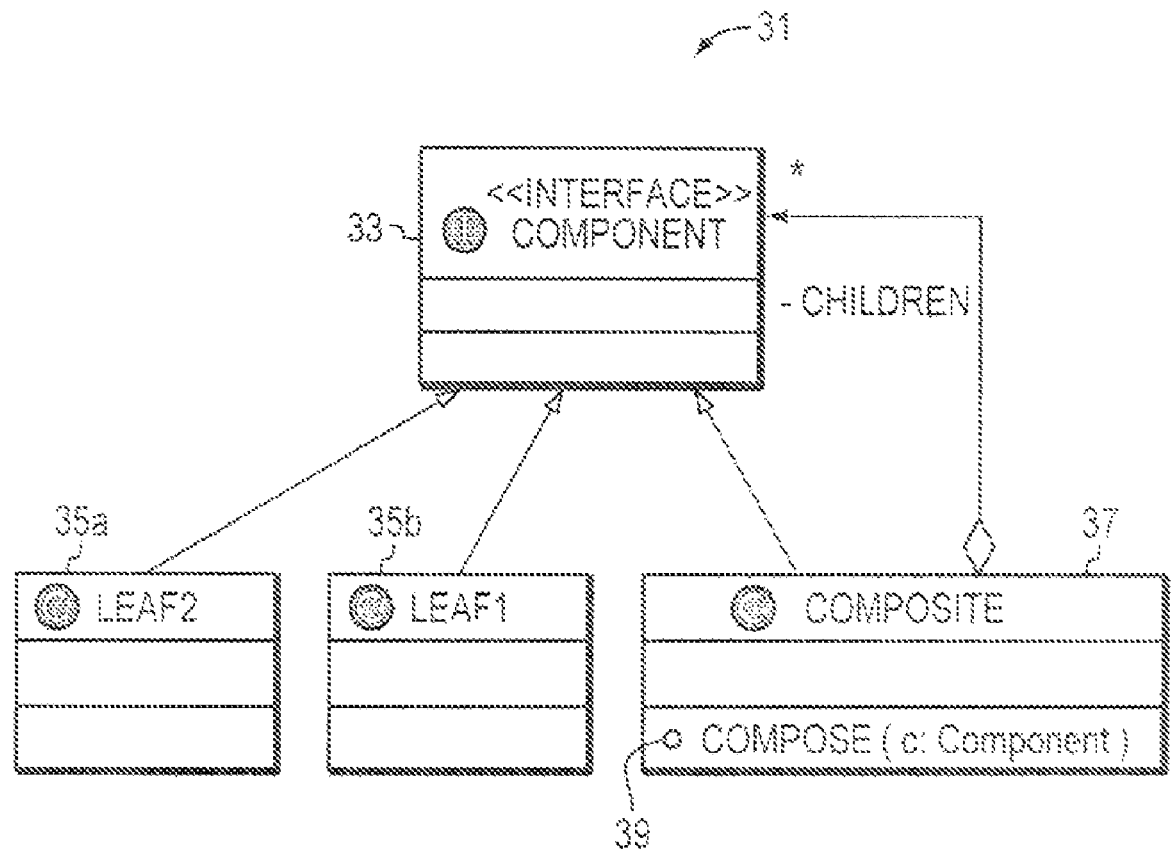
FIG. 3 is a diagram of a simplified GoF composite pattern.
Figure 7:
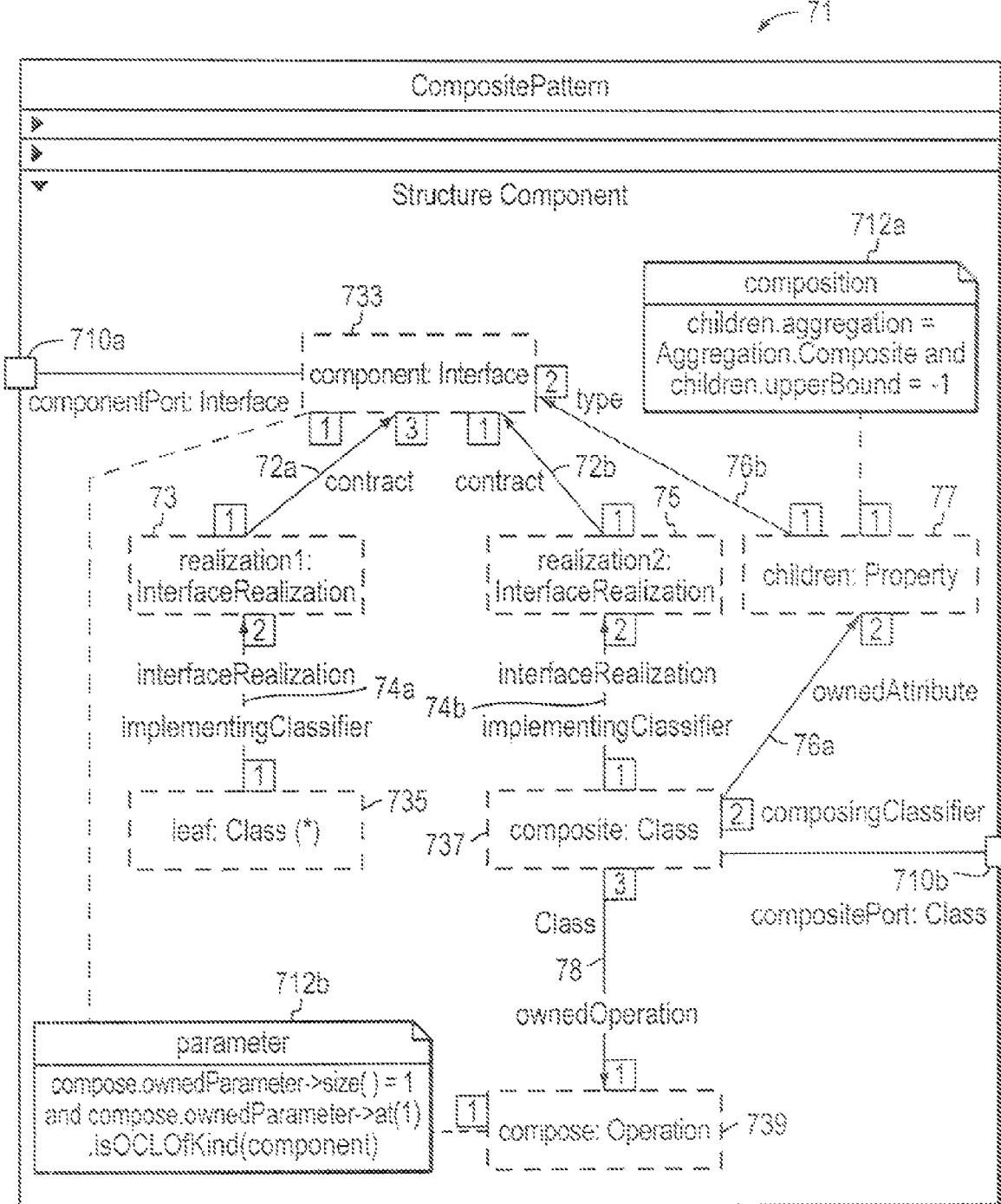
FIG. 7 illustrates Epattern specification for composite pattern.
Figure 8:
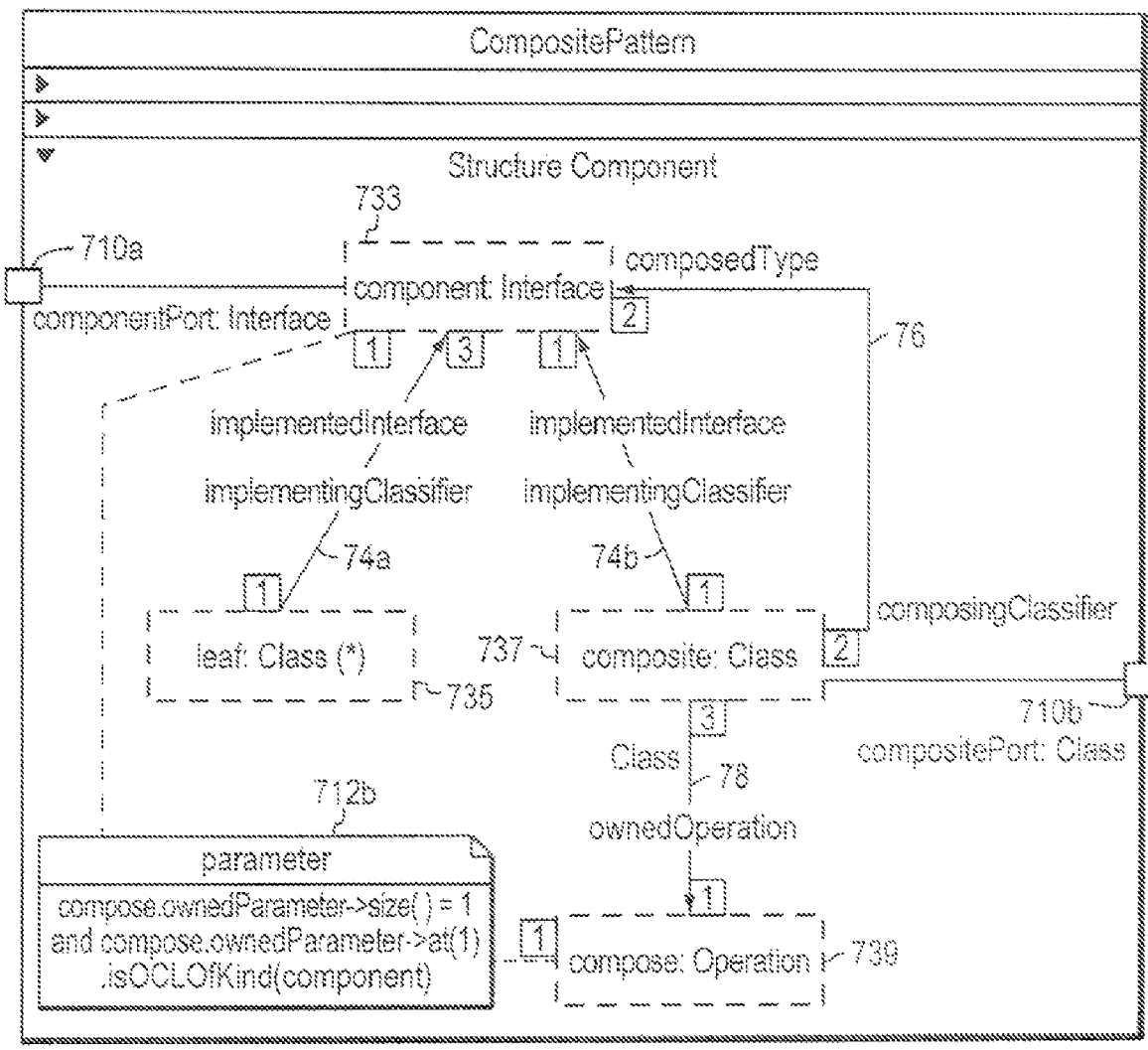
FIG. 8 illustrates a simplified Epattern specification for composite pattern.
Figure 8:
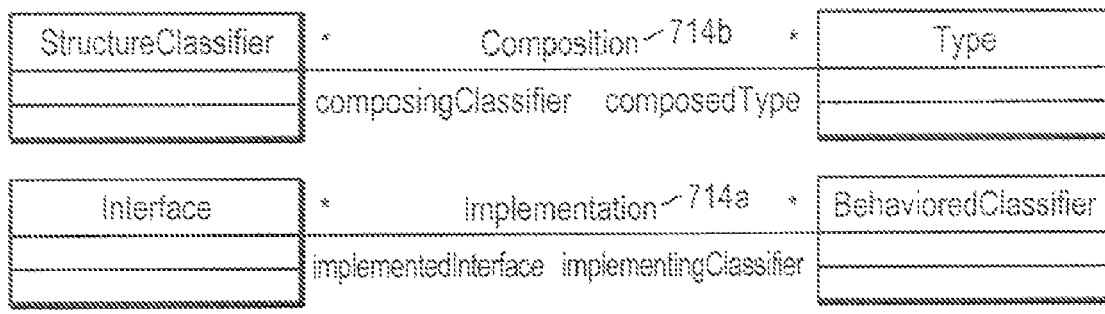

An example composite pattern 71 of the present invention is illustrated in FIGS. 7 and 8. By way of background, the example is a simple variant of the known Gang of Four (GoF) composite pattern 31, shown in FIG. 3. The pattern's M2 target language is UML 2.0. It is classified as a structural pattern and is used to allow a client to treat both single components and collections of components identically. The pattern 31 highlights several roles: a 'component' role 33 representing an instance of UML Interface, a 'leaf' role 35 representing an instance of UML Class that implements the 'component' interface, a 'composite' role 37 representing an instance of UML Class that implements the 'component' interface and also composes instances of the same interface, and finally a 'compose' role 39 representing an instance of UML operation defined by the 'composite' class and used to compose 'component' instances.

Representation of the composite pattern 31 in the present invention (as shown at 71 in FIGS. 7 and 8) is then achieved as follows.

Semantics

Figure 4A:
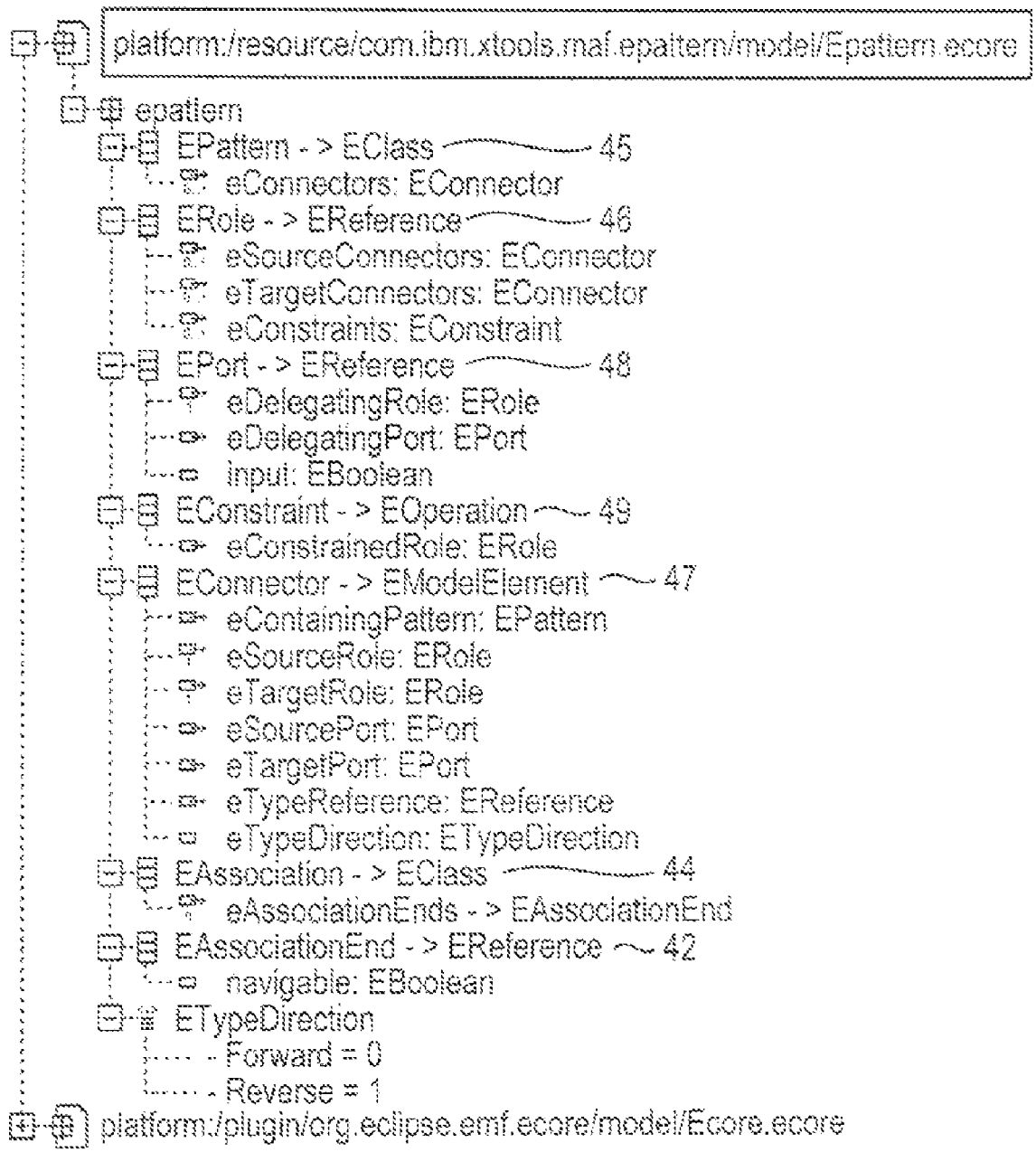

The model 41 and meta-model 43 of Epattern 12, shown in FIGS. 4a and 4b, contains new meta-classes that subclass others in the Ecore meta-model. The following items describe the semantics of these new meta-classes and a feature level description is provided in Appendix A.

EPattern 45 subclasses EClass 25 and is considered the context of a pattern 14 (i.e., represents a pattern's context). A pattern 14 is represented as an instance of EPattern 45 (M3) and therefore a meta-class (M2) at the same level as the target meta-model. An EPattern 45 inherits the name and is Abstract features of an EClass 25 representing the name of a pattern 14 and whether it is abstract or concrete. It also inherits the eStructureFeatures collection that holds the pattern's roles and ports and the eOperations collection that holds the pattern's operations. A new collection is defined for EPattern 45 called eConnectors, which holds the connectors between the pattern roles.

Thus, representing a pattern 14 as a meta-class has big advantages including the ability to build pattern inheritance hierarchies with varying levels of abstraction, the ability to define complex patterns by composing simpler ones, the ability to use namespaces to create pattern families, the ability to be a context for pattern constraints, and the ability to represent pattern instances 16 as objects of the pattern meta-class 14.

In the example (FIGS. 7 and 8), the composite pattern 71 is represented by an EPattern instance 16.

ERole 46 subclasses EReference 24 and represents a role in a pattern 14. ERole 46 inherits the name, multiplicity and type features of EReference. These features are used to indicate the pattern role's name, multiplicity and type, which is usually an EClass 25 from the target semantic domain of an EPattern 45 representing a composed pattern. ERole 46 adds to EReference the ability to be connectable, through eSourceConnectors and ETargetConnectors collections, and constrainable through an eConstraints collection.

Thus, representing a role as a reference helps characterize (using name, type and multiplicity features) M1 instances that play that role in a pattern instance 16. A role can be typed (through eReferenceType that is inherited by ERole from EReference 24 in FIG. 2) with an instance of EClass 25 (M2 level) capturing elements in the pattern's target meta-model 14. To implement pattern composition, a role can simply be typed with an instance of EPattern 45 (which subclasses EClass 25) to represent a composed pattern.

Additionally, the multiplicity feature of a role allows the support of some common role semantics, namely the ability to define optional roles (e.g. leaf 35) and collection roles, which can be bound to more than one instance from the user model (e.g. leaf too). A role with multiplicity lower bounds of 0 and 1 are considered optional and required, respectively. Also, a multiplicity upper bound of * defines a collection role, whereas a value of 1 defines a singular role.

Yet another major advantage of this role representation is simplifying the process of role binding down to the simple process of assigning a value to a feature in a pattern meta-class instance 16. One more advantage is the ability to reference roles in a pattern's constraint just as regular features of the constraint's context (which is a pattern instance 16 at level M1). Moreover, roles are connectable, i.e., a role can be connected to other related roles in the pattern 14 to formalize their relationship, as described below. In the example of FIGS. 7 and 8, the main identified roles (component 733, composite 737, leaf 735 and compose 739) are all represented by instances of ERole 46.

EConnector 47 subclasses EModelElement 30 (FIG. 4b) and represents a connector (or relationship) between two pattern roles. EConnector 47 defines an eSourceRole and an eTargetRole features representing the source and target roles it is connecting. It also defines two optional features, eSourceRole and eTargetPort, representing ports on the source and target roles, respectively, in case they represent instances of composed patterns. In addition, EConnector 47 has an eTypeReference feature, representing an EReference 24 from the target semantic domain that defines the relationship between the types of the two connector ends. Finally, EConnector 47 has an eTypeDirection feature which is an enumeration with 'Forward' and 'Reverse' values, indicating whether the connector's source end is related to its target end through the eReferenceType in the forward or reverse direction.

Restated, a connector characterizes (through its type) a relationship between M1 model elements bound to its two roles in a pattern instance 16. The relationship characterized by a connector's type is a EReference 24 instance from the pattern target meta-model 14. This instance represents a directed relationship between two EClass 25 instances from the meta-model 14. Since it is directed, a connector specifies which of its ends represents the source and which represents the target of the reference through its eSourceRole and eTargetRole features. If one or both roles happen to represent a composed pattern (i.e. typed with EPattern 45), the connector also specifies which port (refer to the EPort meta-class defined below) instance belonging to the composed pattern it is connecting to through the eSourcePort and eTargetPort features.

In the example, various connectors 72, 74, 76, 78 are represented by instances of EConnector 47. In particular, one connector 74b is from composite 737 to component 733 representing an implementation 714a. Another connector 74a is from leaf 735 to component 733 representing an implementation 714a. Connector 76 is from composite 737 to component 733 representing a composition 714b, and connector 78 is from composite 737 to compose 739 representing an owned operation.

EPort 48 subclasses EReference 24 and represents an access point to a pattern, especially one that delegates to one of the pattern roles. An example is a connection point on the pattern's boundary that is used in pattern composition. EPort 48 has an eDelegatingRole feature representing the pattern role it is delegating to/from. It also has an optional eDelegatingPort feature representing a specific port on the delegating role if that role represents an instance of a composed pattern. In one embodiment, an EPort 48 also has a Boolean 'input' feature to indicate whether it is delegating in or out.

When patterns compose each other, roles in the composing pattern are connected to ones in the composed pattern. However, this connection cannot be direct as roles are encapsulated within their defining pattern 14. To expose these roles and make them available for connection to roles in the composing pattern, ports are specified for them in the pattern. Note that not all roles need to have ports; rather only those that are considered key by the pattern author.

An instance of EPort 48 connects through the eDelegatingRole feature to an instance of ERole 46 in the pattern 14. If that role represents a composed pattern, the port needs to also specify which port (through the eDelegatingPort feature) on the composed pattern it is connecting to in turn. An EPort 48 is represented as a reference since it characterizes (through its name and type) the role it is connecting to. A port's type has to match that of the role it is connecting to although in other embodiments this restriction may be removed. A port in CSD may have a different type if connected to its role with a typed connector.

In the example, two roles are anticipated to be connected to if this pattern 71 is composed; these are the composite and component roles 737, 733. Therefore, an instance of EPort 48 is specified for each one of them, namely compositePort 710b and componentPort 710a.

EConstraint 49 subclasses EOperation 20 and represents a well-formedness constraint (a semantic rule) for a pattern 14. EConstraint 49 is attached to a particular pattern role through its eConstrainedRole feature. EConstraint 49 is usually a Boolean operation with a body that asserts a certain property about the pattern role it is associated with. However, for pattern roles whose multiplicities are many, EConstraint 49 could also be an operation returning a filtered collection of valid instances fulfilling some properties for these roles.

Thus, a constraint has a Boolean expression that is specified in a constraint language like EMOF OCL. The context of the constraint is nothing but an instance 16 of a pattern, which makes pattern roles accessible in the expression as regular features of the context. This has the added advantage of being able to specify constraints between one or more pattern roles. To formalize the relationship, an instance of EConstraint 49 references the instances of ERole 46 that it is constraining.

In the example, two constraints 712a, b can be specified with instances of EConstraint 49. The first one 712a is asserting that the association between the composite and the component roles 737, 733 is really a 'composition' and that it has a 'many' multiplicity. The second constraint 712b is asserting that an operation bound to the compose role 739 has exactly one parameter whose type matches the interface of the component role 733.

EAssociation 44 subclasses EClass 25 and represents a new derived relationship between two EClass 25 instances from the pattern's target meta-model (target domain). The new association is usually defined to hide the complexity of the target domain and/or to allow for the reusability of common relationships used across pattern definitions of that domain. EAssociation 44 inherits the name and is Abstract features of an EClass 25 representing the name of an association and whether it is abstract or concrete. EAssociation 44 also defines a new collection called eAssociationEnds that holds the two ends of the association.

Accordingly, by defining EAssociations 44, one simplifies pattern specification by introducing high level relationships that can be specified between pattern roles. Without this concept, only low level relationships represented by EReferences 24 from the meta-model can be used between roles. A problem can occur when no direct EReferences 24 exist between EClass 25 instances in the meta-model that are types of related roles. In this case, a pattern author would need to work around that by introducing a set of intermediary roles increasing the complexity of the specification.

As such, an EAssociation 44 is effectively a namespace that defines two association ends (refer to EAssociationEnd meta-class defined below). These ends characterize a new relationship between two EClass 25 instances from the target meta-model. An EAssociation 44 is the container of EReferences 24 and hence has to subclass EClass 25 (Ecore restriction).

In the example, two instances of EAssociation 44 are specified as they represent high level relationships that are used by the composite pattern 71 but do not map to direct EReferences 24 in the Ecore UML meta-model 21. The first EAssociation instance 714a is the 'Implementation' relationship between the composite role 737 and the component role 733 and between the leaf role 735 and the component role 733. The second EAssociation instance 714b is the 'Composition' relationship between the composite 737 and component 733 roles.

EAssociationEnd 42 subclasses EReference 24 and represents one end in an EAssociation 44. Representing an end as a reference makes it straightforward to use as a type for EConnectors 47 in pattern specifications. The instance of an AssociationEnd is used as a value for the EConnector's eTypeReference feature. An EAssociationEnd 42 inherits the name, multiplicity and type features of EReference 24. These features are used to indicate the association end's name, multiplicity and type. Thus the EAssociationEnd 42 is typed with an EClass 25 instance from the target meta-model (target domain).

If an end's EAssociation 44 represents a bidirectional relationship, its opposite EReference 24 is set to the other EAssociationEnd 42 in the same association. One main difference between EReference 24 and EAssociationEnd 42 is that the former is owned by an EClass 25 representing one end of a relationship and typed with the other, while the latter is always owned by an EAssociation 44 and the two associated EClasses 25 are derived from the types of both ends of the association. Thus, unlike an EReference 24 whose value can be accessed with a simple getter, every one of the two ends of an association is accessed with a getter that takes an instance of the other association end's type as a parameter and derives the return value from it. As such, an end represents a derived reference, and hence has a derivation expression specified in a language like EMOF OCL. The type of the expression is the same as that of the end and the context of the expression is an instance of the type of the opposite end.

Also unlike EReferences 24 that are created in the eStructuralFeatures collection, EAssociationEnds 42 are created in the EAssociation's 44 eAssociationEnd collection.

In the example of FIGS. 7 and 8, the 'Implementation' association 714a has two EAssociationEnd 42 instances (named 'implementedInterface' and 'implementedClassifier') typed with 'BehavioredClassifier' and 'Interface' from the UML meta-model. Also, the 'Composition' association 714b has two EAssociationEnd 42 instances (namely, 'composingClassifer' and 'composedType') typed with 'StructuredClassifier' and 'Type' from the UML meta-model.

Notation

The notation for Epattern 12 is based on the notation of the class and composite structure diagrams of UML 2.0. This makes it easier to leverage already existing UML tools in pattern specification. Table 1 below illustrates this notation.

TABLE 1

Epattern notation

| Description | Notation |
|---|---|
| EPattern 45: a frame with a name compartment and a structure compartment showing the pattern's structure. Other optional compartments could be shown for the pattern's super types, roles, ports, connectors and constraints. | 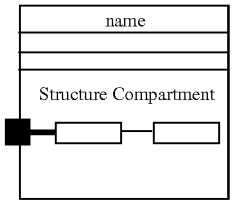 |
| ERole 46: a box containing a compartment that shows the role's name, type and multiplicity (lower- Bound . . . upperBound if different from 1 . . . 1). The box is solid if the role represents a pattern composition and dashed otherwise. Also, the box has a structure compartment if it represents a pattern composition. | 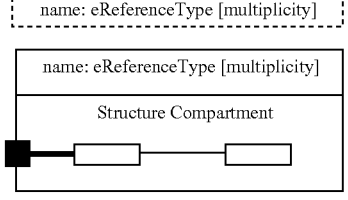 |
| EPort 48: a small filled box on the frame of the structure compartment. The box has a floating name label that shows the name and type of the port. The box is either connected directly to a delegating role (left port in figure) or to a delegating role's port if the role represents a composed pattern (right port in figure). | 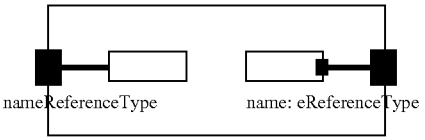 |
| EConstraint 49: a sticky note with a name compartment and an expression compartment. The note is connected to the constrained roles with dotted lines. | 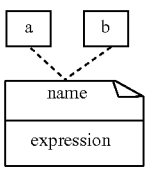 |
| EConnector 47: a directed arrow that goes from the pattern's source role to its target roles. If a connector has a source/target port, the line connects that port on the corresponding role. The connector has floating labels showing the connector's type reference (eType) and its opposite (if any). | 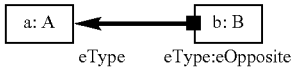 |
| EAssociation 44: a line connecting two EClass instances from the pattern target language meta-model. The line has a floating name label, two floating end name labels, and two floating end multiplicity labels. The line can be shown as an arrow if the association is directed. | 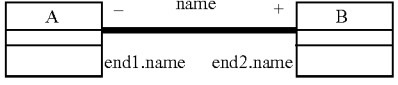 |

Specification Process

Figure 5:
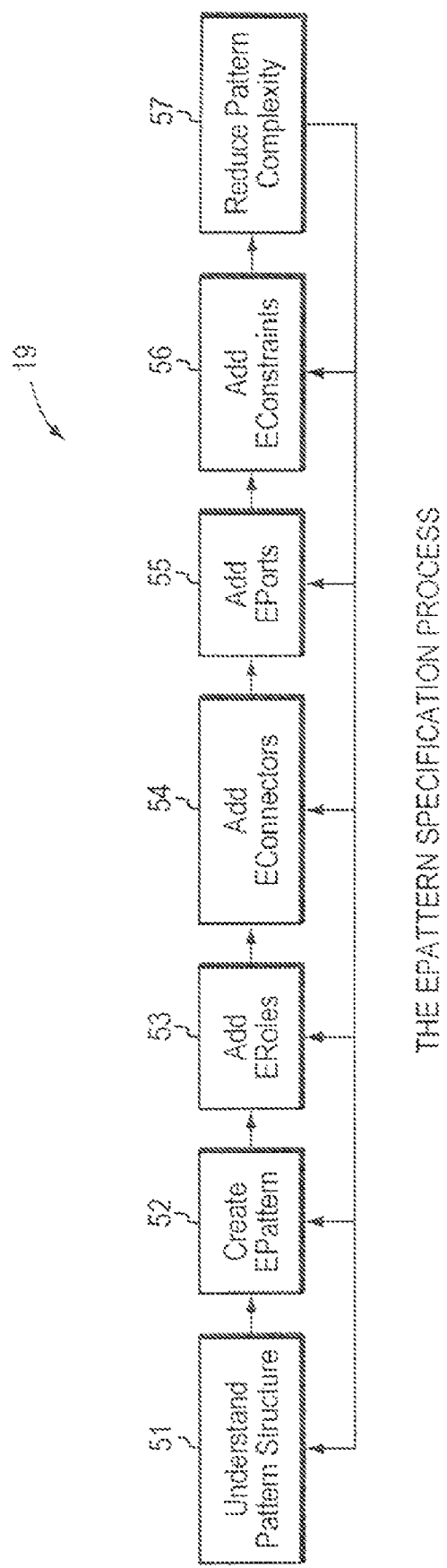
FIG. 5 is a flow diagram of the Epattern specification process.

Applicant proposes a recommended iterative specification process 19 for using the Epattern language 12. The outcome of this process 19 is a formal pattern specification. The process 19 is depicted in FIG. 5 and explained in the following suggested order of steps. In practice, a pattern author may move from any step to any other step in an iterative fashion. The composite pattern 71 example of FIGS. 7 and 8 is used to illustrate the process 19 and the notation provided above.

With reference to the Understand Pattern Structures step 51, before a pattern 14 is specified with Epattern 12, there has to be a good understanding of its structure. A pattern's structure is a set of roles, typed with M2 meta-classes from a target meta-model and related to each other through meta-references. In the example, the target meta-model is UML 2.0, simplified in FIG. 6 for the purposes of illustration. The class diagram in FIGS. 7 and 8 reveals the following roles: component 733 of type 'Interface' 63, composite 737 and leaf 735 of type 'Class' 67 and compose 739 of type 'Operation' 69. The relationships between these roles include an 'implementation' 714a between leaf 735 and component 733 and between composite 37 and component 733, which is realized by an element 61 of type 'InterfaceRealization' (meta-class in FIG. 6). The element 61 is related to the interface 63 by the meta-reference 'InterfaceRealization, contract' and to the class 67 by the meta-reference 'BehavioredClassifier.interfaceRealization'. The syntax for meta-reference 'X.Y' refers to an EReference named Y in an EClass named X. BehavioredClassifier 67 and StructuredClassifer 64 are two illustrated classes 67. Another relationship is 'composition' between composite 737 and component 733, which is realized by an element 65 of type 'Property'. The element 65 is related to the class 67 by the meta-reference 'StructuredClassifier.ownedAttribute' and to the interface 63 by the meta-reference 'Property.type'. Type element 66 is a classifier 68. Finally, composite 737 is related to compose 739 directly by meta-reference 'Class.ownedOperation'.

Next is the Create EPattern step 52 (FIG. 5). Once there is a good understanding of the pattern's structure, the pattern 14 can be specified using the Epattern 12 meta-model (M3 level). The first step is to create an instance of EPattern 45 in an EPackage 28 that belongs to a patter model. The instance is given a name representing the pattern 14. In the FIGS. 7 and 8 example, an instance 71 is created and named 'CompositePattern'. A complete Epattern specification of this pattern (instance 71 of EPattern 45) is shown and described in FIGS. 7 and 8.

Continuing with FIG. 5, the Add ERoles step 53 is next. Once an Epattern 45 instance is created, every pattern roles identified in step 51 is modeled by an instance of ERole 46 in the pattern's eRoles collection. Each ERole instance is given the name of the role, and typed, through its eReferenceType feature, with an EClass 25 instance representing the type of the role in the target meta-model. If the role represents a composed pattern, it is typed with an EPattern 45 instance instead, and its containment feature is set to true. In addition to the main roles identified in step 51, some intermediary roles might be initially needed to allow the main roles to be connected by connectors typed only with EReferences 24 from the meta-model. In the example, ERole instances 733, 735, 737, 739 (FIG. 7) for the main roles (component 733, composite 737, leaf 735 and compose 739) identified in step 51 are created. In addition, based on the meta-model in FIG. 6, ERole instances for intermediary roles 73, 75, 77 are needed to connect the main roles. Two such instances typed with 'InterfaceRealization' are needed to represent the implementation relationship between the composite 737 and component 733 roles and between the leaf 735 and component 733 roles. The former role is a Class, the latter role is an Interface and those two metal-classes are related through InterfaceRealization 61 in FIG. 6. The corresponding ERole instances are named 'realization1' and 'realization2' at 73 and 75 in FIG. 7. For similar reasons, another ERole instance 77 typed with 'Property', and named 'children', is needed to represent the composition relationship between the composite 737 and component 733 roles. All of the role instances have their multiplicity set to '1 . . . 1' except for the leaf role 735, where it is set to '*', indicating that the role is optional and represents a collection.

The next step after creating roles is connecting them by EConnector 47 instances (e.g., Add EConnectors step 54, FIG. 5). An instance is created in the pattern's eConnectors collection to specify every identified relationship in step 51 (and in previous specification phases) between pattern roles. Instances of source and target roles are assigned to the connector's eSourceRole and eTargetRole features. If one or both roles represent composed patterns, i.e., typed with EPattern 45, the connector's eSourcePort and/or eTargetPort features are also set to instances of EPort 48 owned by the composed EPattern 45. The connector's type is set of an EReference 24 from the target meta-model representing a directed relationship between the EClass 25 instances typing the connector's source and target roles (or ports if specified).

Figure 6:
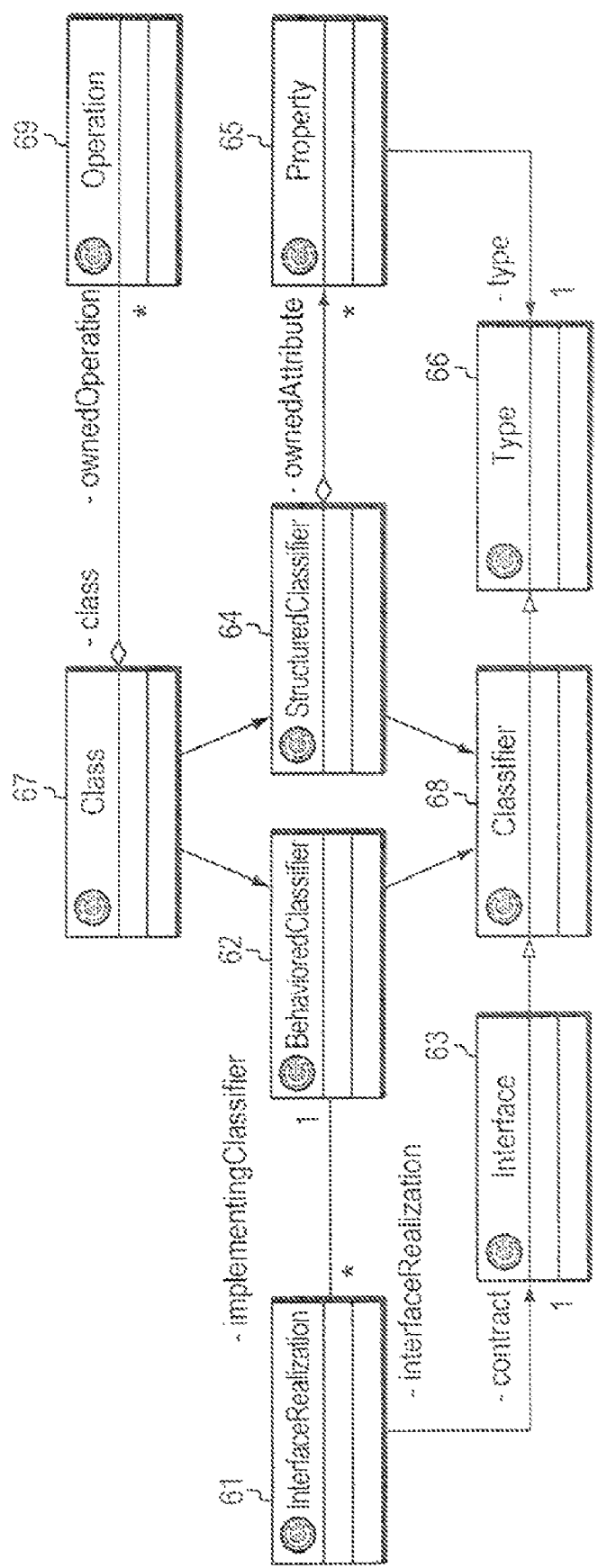
FIG. 6 is a diagram of a partial, simplified UML 2.0 meta-model.

In the example, several connectors are specified using meta-references in FIG. 6. Namely, two connectors 72a, b are typed with 'InterfaceRealization.contract' from 'realization1' (instance 73) to component 733 and from 'realization2' (instance 75) to 'component' 733. Two connectors 74a, b are typed with 'BehavioredClassifier. interfaceRealization' from 'leaf' 735 to realization1 (instance 73) and from 'composite' 737 to 'realization2' (instance 75). A connector 76a is typed with 'StructuredClassifier.ownedAttribute' from 'composite' 737 to 'children' 77. Another connector 76b is typed with 'Property.type' from 'children' 77 to 'component' 733. Another connector 78 is typed with 'Class.ownedOperation' from 'composite' 737 to 'compose' 739.

Continuing with FIG. 5, the Add EPorts step 55 is next. Once pattern roles have been specified, ports are added to expose some roles that are considered key. For each such port, an instance of EPort 48 is added to the pattern's ePorts collection. The instance is connected to a role through its eDelegatingRole feature. If the role represents a composed pattern, i.e., typed with EPattern 45, the instance's eDelegatingPort feature is also set to an EPort 48 instance owned by the composed pattern. Then the port is given a name that correlates to its connected role and is typed with the same type of that role (or port if specified). In the example shown in FIGS. 7 and 8, two ports 710a, b are specified: 'componentPort' 710a connected to 'component' 733 and typed with 'Interface' and 'compositePort' 710b connected to 'composite' 737 and typed with 'Class'.

After the basic pattern structure is specified, well-formedness constraints are added at Add EConstraints step 56 (FIG. 5). Each constraint is represented by an instance of EConstraint 49 in the pattern's eConstraints collection. A constraint is given a name and a boolean expression in a constraint language. The constraint's eConstrainedRoles feature is then set to the ERole 46 instances constrained by the constraint.

In the example, two constraints 712a, b are specified. The first constraint 712a is named 'composition' and connected to the 'children' role 77, and is specified in OCL as follows: 'children.aggregation=AggregationKind.Composite and children.upperBound=−1' (the second conjunct specifies a 'many' multiplicity). The second constraint 712b is named 'parameter' and connected to both 'component' role 733 and 'compose' role 739. Constraint 712b is specified in OCL as: 'compose.ownedParameter->size ( )=1 and compose.ownedParameter->at (1).IsoclOfKind(component)'.

At step 57 in FIG. 5, the present invention pattern specifications can get large and complex. Various features are provided in Epattern 12 to manage this complexity including specifying patterns by inheritance and composition, refactoring common constraint logic in operations and eliminating intermediary roles through derived associates. This last feature can be achieved by the specification of EAssociations 44. An instance of EAssociation 44 is created in an EPackage 29 that belongs to a pattern model and given a name corresponding to the represented relationship. After that, two instances of EAssociationEnd 42 are created in the association's eAssociationEnd collection. Every such instance is typed with an EClass 25 from the target meta-model and given a name that corresponds to the role played by that end of the association. The end's multiplicity is then specified along with its navigable feature. Every navigable end represents a derived reference from the end's EClass type to the other end's EClass type. In this case, an end gets a derivation expression in a language like OCL to derive M1 instances 16 conforming to the end's type from the context of an instance conforming to the other end's type. If both ends are navigable, they reference each other through their eOpposite feature. Once ends are specified, complex pattern specifications can be refactored to use EAssociationEnd 42 instances rather than EReference 24 instances to type connectors.

In the example of FIGS. 7 and 8, two instances of EAssociation 44 are specified. The first instance 714a is named 'Implementation' between EClass 25 instances 'BehavioredClassifier' and 'Interface'. 'Implementation' 714a is used to type a connector directly from 'compose' role 739 to component role 733 or from 'leaf' role 735 to 'component' role 733. The second EAssociation instance 714b is named 'Composition' between EClass 25 instances 'StructuredClassifier' and 'Type'. This EAssociation 714b is used to type a connector from 'composite' 737 to 'component' 733. The simplified pattern specification illustrates these instances 714a, b of EAssociation 44 at the bottom of FIG. 8. This part of the figure also shows the specification of the two derived associations ('StructuredClassifier' derived from 'composingClassifier' and 'BehavioredClassifier' derived from 'implementingClassifier').

Further example processes of pattern modeling with invention Epattern 12 are as follows:

EAssociation Modeling

An EAssociation 44 models a more user-level association between types from the pattern target domain. An EAssociation 44 is not a new association but rather one that can be derived from one or more real associations in the target domain. The process of modeling an EAssociation 44 is as follows:
1. Create/find an Epattern model to define the EAssociations 44 in.
2. Create/find an EPackage 29 to own the EAssociations 44 in the Epattern model.
   Specify the name of the EPackage 29 (if new) by setting its name feature.
3. For every identified association, create an EAssociation 44 in the EPacakge's eClassifiers collection
   Specify the name of the EAssociation 44 by setting its name feature.
4. For every one of the two association ends, create an EAssociationEnd 42 in the EAssociation's eAssociationEnds collection
   Specify the name of the end by setting its name feature.
   Specify the type of the end by setting its eType feature to an EClass 25 from a domain model.
   Specify the multiplicity of the end by setting its lowerBound and upperBound features
   Specify the end's derivation expression and language by creating a GenModel annotation and specifying its body and language tagged values.

EPattern 45 Modeling

An EPattern 45 models a pattern in a target semantic model. The process of modeling an EPattern 45 is as follows:
1. Create/find an Epattern model to define the EPatterns 45 in.
2. Create/find an EPackage 29 to own the EPatterns 45 in the Epattern model.
   Specify the name of the EPackage 29 (if new) by setting its name feature.
3. For every pattern, create an EPattern 45 in the EPackage's eClassifiers collection
   Specify the name of a pattern by setting its name feature.
4. For every pattern role, create an ERole 46 in the EPattern's eStructuralFeatures collection
   Specify the name of the role by setting its name feature.
   Specify the type of the role by setting its eType feature to an EClass 25 from a target domain.
   Specify the multiplicity of the role by setting its lowerBound and upperBound features
   Specify the aggregation kind of the role by setting its containment feature to true/false (always false for non composed pattern roles).
5. For every other role constraint, create an EConstraint 49 in the EPattern's eOperations collection
   Specify the name of the constraint by setting its name feature.
   Link the constraint to its role by Setting its eConstrainedRole feature
   Specify the constraint's details by creating a GenModel annotation and specify its body and language tagged values.
   Specify the return type of a constraint to be Boolean, except if the constraint represents a filter on the role value, then the return type would be the same as that of the constrained role.
6. For every two related roles, create an EConnector 47 in the EPattern's eConnectors collection
   Specify the connector's source role by setting its eSourceRole feature.
   Specify the connector'target role by setting its TargetRole feature.
   When connecting composed pattern roles, specify the connector's eSourcePort and/or eTargetPort features.
   Specify the type reference to the connector by setting its eType to either an EReference 24 from a domain model or an EAssociationEnd 42 from a pattern model 14.
7. For every public role, create an EPort 48 in the EPattern's eStructuralFeatures collection.
   Specify the name of the port by setting its name feature.
   Connect the port to its role by setting its eDelegatingRole feature.
   If a port is delegating to a composed pattern role, set its eDelegatingPort feature.
   Specify the type of the port by setting its eType feature to the same type as its delegating role or port.
   Refactor EPatterns 45 with similar roles and connectors and that have general-specific relationships into inheritance hierarchies by setting the EPattern's eSuperTypes collection.

Refactor EPatterns 45 with similar roles and connectors and that have whole-part relationships using composition by typing roles in the whole EPattern 45 with EPatterns of the part.

Refactor EPatterns 45 with similar roles and connectors and that only differ in non structural details by refactoring those details into EAttributes 22 that can be referenced instead and set at runtime on the EPattern 45 instance.

Refactor common logic that is used in constraints into EOperations 20 that can be called from those constraints.

Remove those unneeded roles that have the sole purpose of allowing the connection of needed roles with associations from the target meta-model, by creating or using pattern-defined EAssociations 44 that help abstract out several meta-associations.

An Example of a Pattern Defined in Epattern 12

Figure 9:
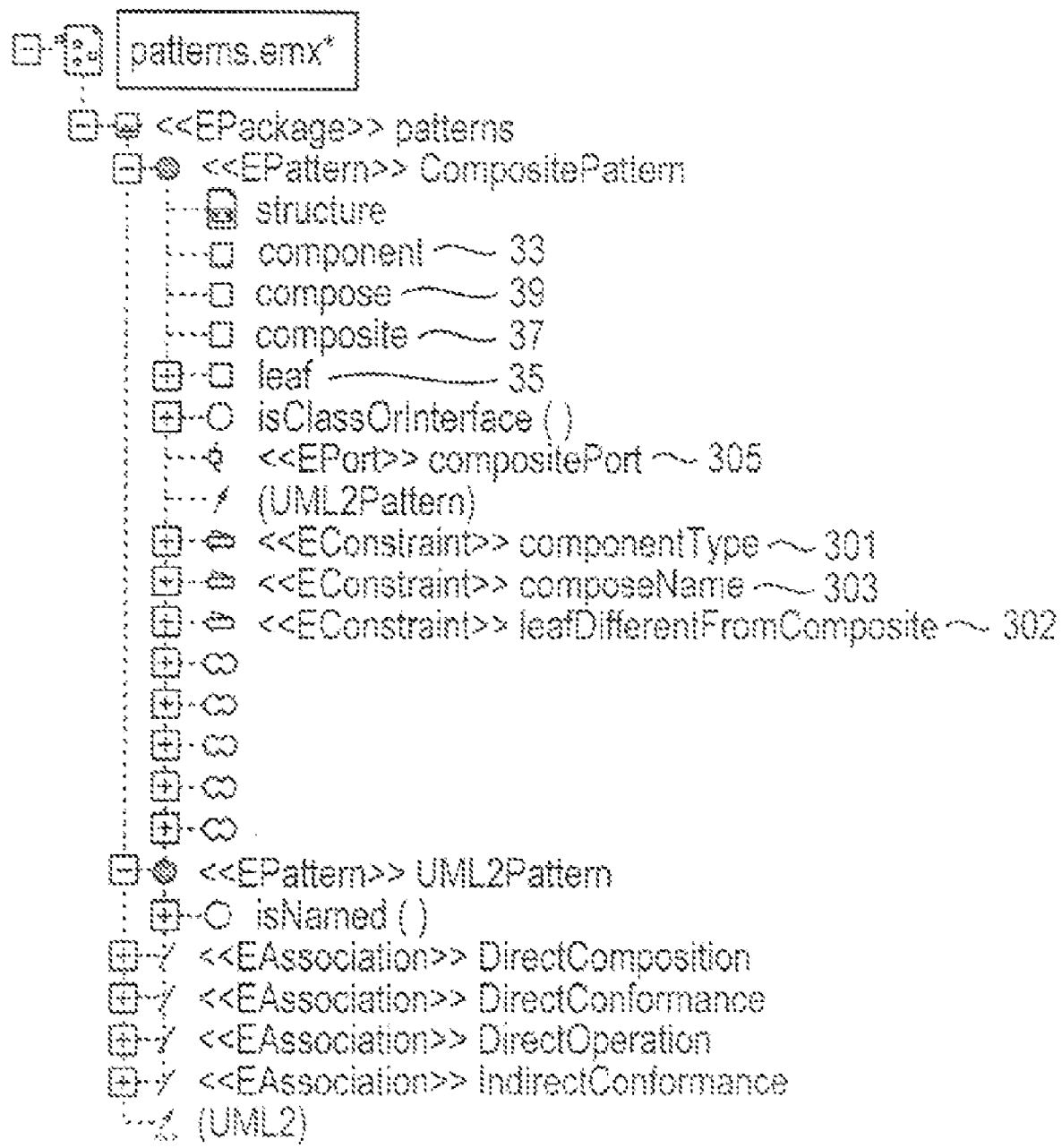
FIG. 9 is an illustrated definition of the composite design pattern in UML2.
Figure 10:
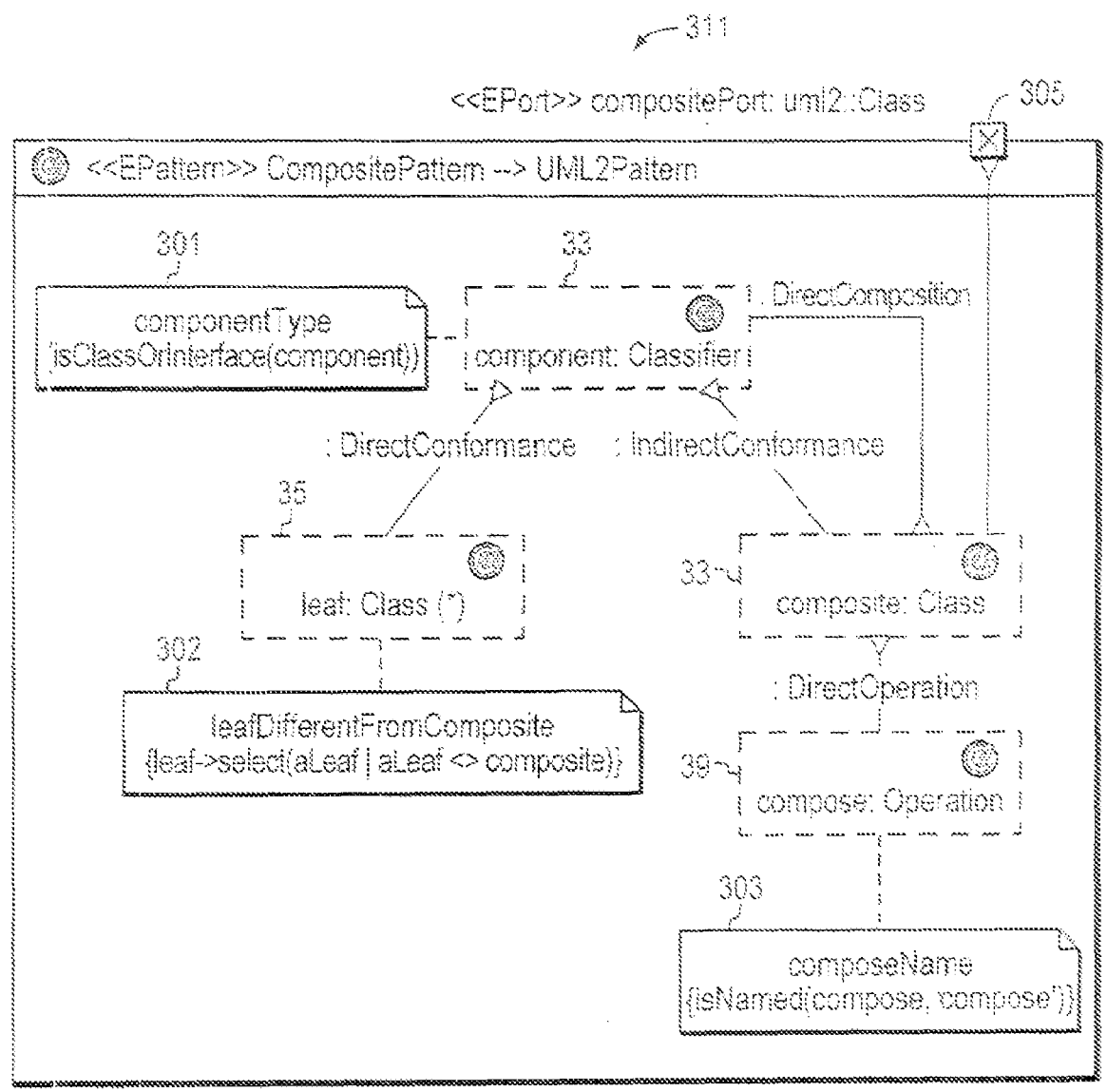
FIG. 10 is a UML structure diagram showing the definition of the composite pattern.
Figure 11:
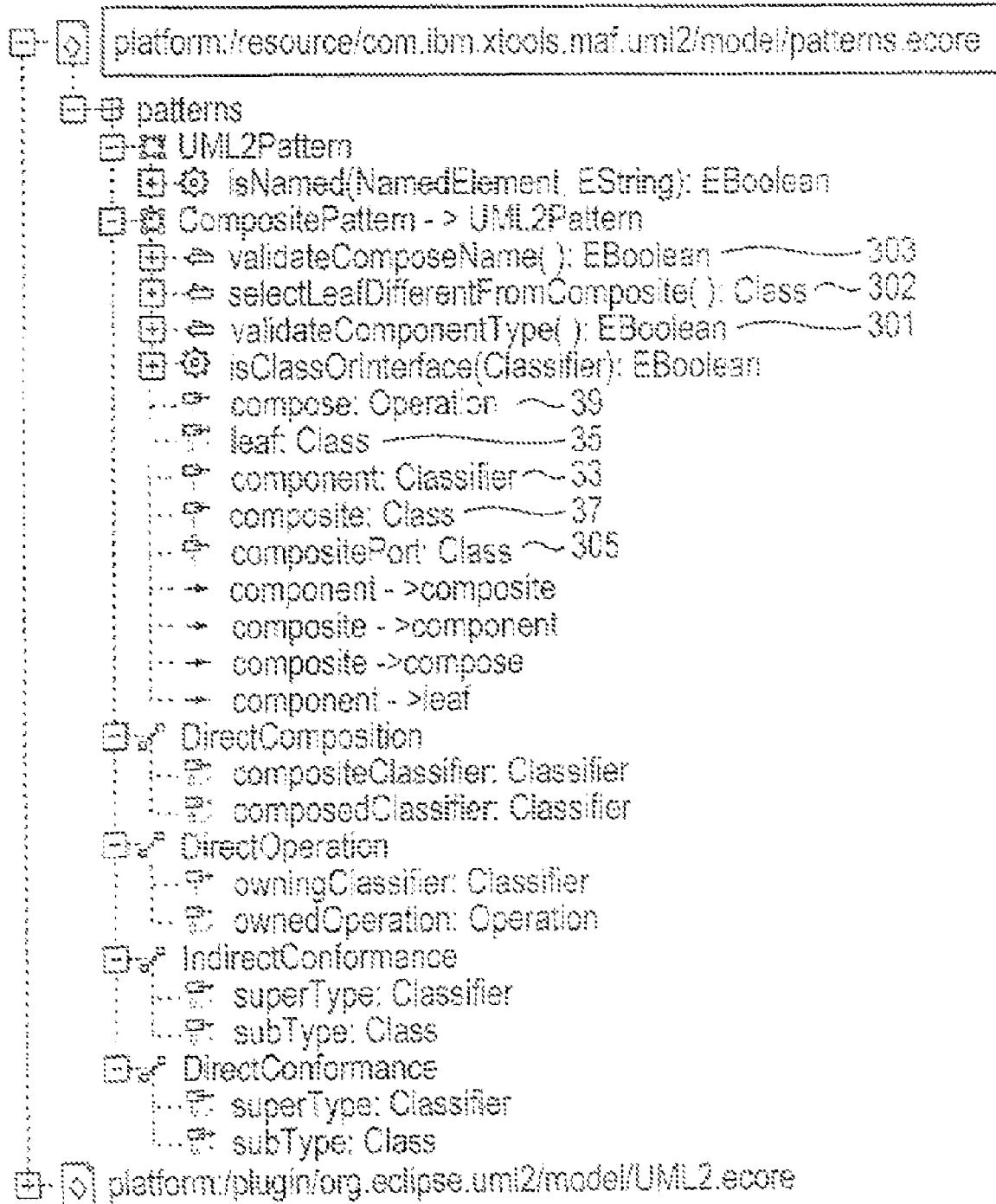
FIG. 11 is an illustrated definition of the composite pattern in Epattern.

As mentioned previously, the GoF patterns are well known software design patterns. One of these patterns is the Composite pattern 311, where an interface or a class plays the role of a 'component' 33. A class that conforms the component 33 plays the role of a 'leaf' 35, and another class that conforms to the component 33 but also aggregates instances of it plays the role of a 'composite' 37. The 'composite' class has a 'compose' operation 39 to help with aggregating the component 33 instances. Such a pattern 311 can be specified in invention Epattern 12 as illustrated at 71 in FIGS. 7 and 8 discussed above. In some embodiments, the pattern 311 may first be specified in UML2 using a similar process to that of Epattern 12 as illustrated in FIG. 9. Roles 33, 35, 37, 39, ports 305, constraints, 301, 302, 303 and so forth are specified The actual structure diagram of the pattern 311 is then as shown in FIG. 10. The UML2 model of the subject pattern definition can then be converted to Epattern to arrive at the model (pattern definition) in FIG. 11.

In summary, detecting (un)desirable patterns is an important component of model analysis. But patterns need to be formally specified before they can be manipulated by tools. The specification approach should ideally support patterns of any MOF-compliant language and be able to scale to patterns of different complexities. In this disclosure, Applicant presents the PMF framework and its Epattern specification language that specifically target such properties (based on the Ecore platform in one embodiment). In the context of the OMG's 4-layer meta-modeling architecture (FIG. 1), Epattern 12 has M3 semantics used to specify patterns 14 at the M2 level. In that sense, a pattern 14 is specified as a metaclass. This gives it the ability to be instantiated, inherited and composed.

The process usually involves creating pattern instances in the context of pattern detection and/or pattern application. Since a pattern 14 is described with Epattern 45 which extends off EClass 25, a pattern instance 16 is defined by an EObjects whose eClass is an EPattern 45. Therefore, a similar process for working with EObjects exists in the context of patterns 14 and pattern instances 16. For example, a code generator processes an Epattern model and creates code classes that correspond to EPatterns 45 (and EAssociations 44). Clients 50 then instantiate these classes to create pattern instances 16. Since these classes subclass EObject, they benefit from all the Ecore features of persistence and change notification. When changes need to be done to a pattern 14, they are done in the Epattern model, and then another cycle of code generation and use of the generated code is performed until the pattern definition is stabilized.

Accordingly, at the core of the present invention is the formal specification of model patterns using a new Epattern language. In at least one embodiment the present invention provides formal specification of model patterns using the semantics of a target domain, e.g., the UML2 composite or other structure.

Figure 12A:
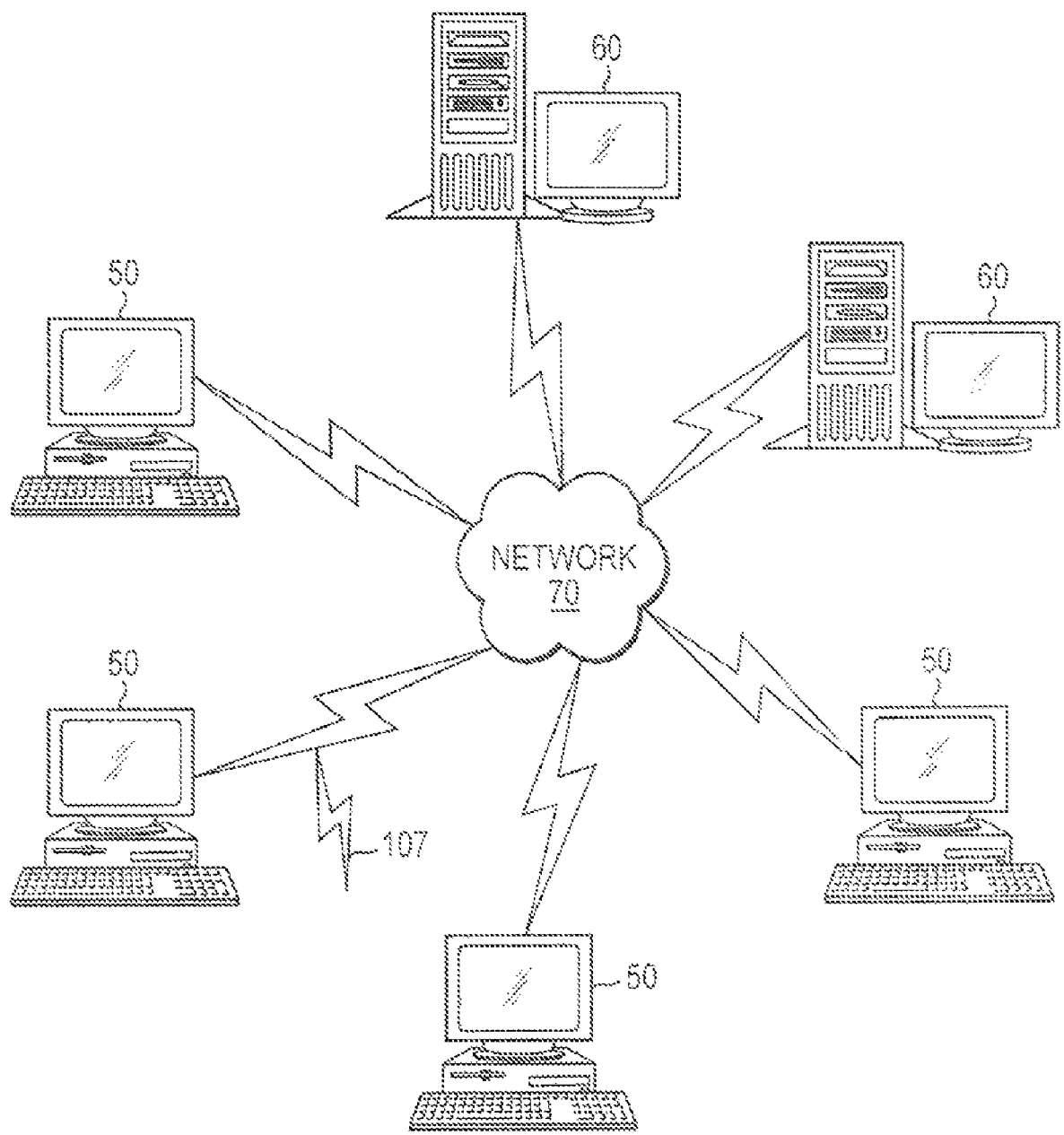
FIGS. 12a-12b are schematic and block diagrams, respectively, of a computer network system in which embodiments of the present invention are deployed.

FIG. 12*a* illustrates a computer network or similar digital processing environment in which the present invention may be implemented. Client computer(s)/devices 50 and server computer(s) 60 provide processing, storage, and input/output devices executing application programs and the like. Client computer(s)/devices 50 can also be linked through communications network 70 to other computing devices, including other client devices/processes 50 and server computer(s) 60. Communications network 70 can be part of a remote access network, a global network (e.g., the Internet), a worldwide collection of computers, Local are or Wide area networks, and gateways that currently use respective protocols (TCP/IP, Bluetooth, etc.) to communicate with one another. Other electronic device/computer network architectures are suitable.

Figure 12B:
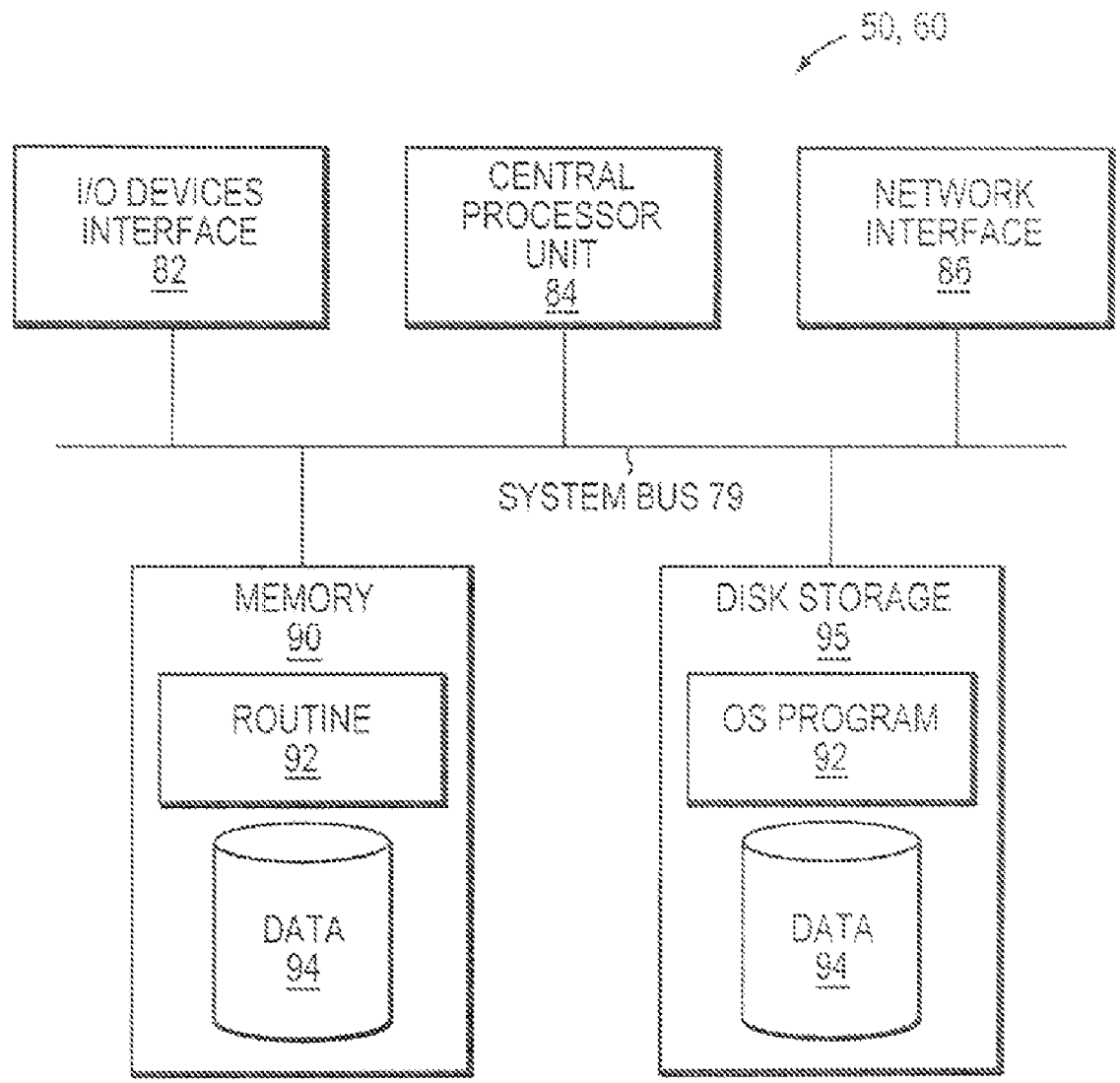

FIG. 12*b* is a diagram of the internal structure of a computer (e.g., client processor/device 50 or server computers 60) in the computer system of FIG. 12*a*. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 12*a*). Memory 90 provides volatile storage for computer software instructions 92 and data 94 used to implement an embodiment of the present invention (e.g., Epattern language specifications 12, meta-model patterns 14, pattern instances 16, user objects 17 and the like detailed above). Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagation medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagation medium, storage medium and the like.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

APPENDIX A

Epattern Meta-model Description

The following is a description of the new concepts in the Epattern meta-model. It includes description of new features (marked with '*') and inherited ones (form Ecore):

1. Epattern→EClass
It represents a pattern
name: String
It specifies a name for the pattern.
abstract: boolean
It specifies whether the pattern is abstract or concrete.
*eSuperPattern: EPattern (non-containment, eSuperTypes)
A reference to the pattern's super pattern
*eRoles: ERole (non-containment, ⊆ eReferences)
A collection of references to the pattern's roles
*ePorts: EPort (containment)
A collection of references to the pattern's ports
*eConstraints: EConstraint (non-containment, ⊆ eOperations)
A collection of references to the pattern's constraints
*eConnectors: EConnector (containment)
A collection of references to the pattern's connectors 2. ERole→EReference
It represents a pattern role
name: String
It specifies a name for the pattern role.
lowerBound: int
It specifies a lower bound on the role's multiplicity. A value of 0 or 1 indicates whether the role is optional or required respectively
upperBound: int
It specifies an upper bound on the role's multiplicity. A value of * or 1 indicates whether the role is collection or singular respectively.
eType: EClass (non-containment)
A reference to the role's type, which can either be an EClass from the pattern's target metamodel or an EPattern representing a composed pattern
containment: boolean
It specifies whether the role represents a composed pattern or not.
*eConstraints: EConstraint (non-containment)
An 'ordered' collection of reference to the role's constraints
*eConnectors: EConnector (non-containment)
An 'ordered' collection of reference to the role's connectors 3. EConnector→EModelElement
It represents a connector between two pattern roles
*eSourceRole: ERole (non-containment)
A reference to the connector's source role
*eTargetRole: ERole (non-containment)
A reference to the connector's target role
*eSourcePort: EPort (non-containment)
A reference to the connector's source port if the source role represents a composed pattern
*eTargetPort: EPort (non-containment)
A reference to the connector's target port if the target role represents a composed pattern
*eType: EReference (non-containment)
A reference to the connector's type, which can either be an EReference from the pattern's target meta-model or an EAssociationEnd of a derived association 4. EPort→EReference
It represents a port on the boundary of a pattern that connects to a pattern role
name: String
It specifies a name for the pattern port.
*eDelegatingRole: ERole (non-containment)
A reference to a role connected to the port
*eDelegating Port: EPort (non-containment)
A reference to a port on another pattern if the delegating role represents a composition of that pattern
eType: EClass (non-containment)

A reference to the port's type, which is an EClass from the pattern's target meta-model (the type has to match that of the delegating port if specified; otherwise that of the delegating role)

5. EConstraint→EOperation

It represents a constraint on one or more pattern roles
name: String
It specifies a name for the pattern constraint.
*expression: String
It specifies a boolean-typed expression in the context of an instance of the pattern
*language: String
It specifies a constraint language (e.g. EMOF OCL) used for the expression
*eConstrainedRoles: ERole (non-containment)
A collection of references to the constrained pattern roles 6. EAssociation→EClass It represent a new derived association between two EClasses from the pattern's target meta-model
name: String
It specifies a name for the association
*eAssociationEnds: EAssociationEnd (containment)
A collection of references to the two association ends 7. EAssociationEnd→EReference It represents an end in a derived association
name: String
It specifies a name for the association end
lowerBound: int
It specifies a lower bound on the association end's multiplicity.
upperBound: int
It specifies an upper bound on the association end's multiplicity.
eReference Type: EClass (non-containment)
A reference to the association end's type, which is an EClass from the pattern's target metamodel
*navigable: boolean
It specifies whether instances of this association end's type can be derived from an instance of the opposite association end's type
*eOppositeEnd: EAssociationEnd (non-containment, ⊆ eOpposite)
A reference to the opposite association end if both ends are navigable
*expression: String
It specifies an expression in the context of an instance of the opposite association end's type used to derive instances of this association end's type
*language: String
It specifies a language (e.g. EMOF OCL) used for the derivation expression While this invention has been particularly shown and described with references to example embodiments thereof, it will be understood by those skilled in the art that various changes in form and details may be made therein without departing from the scope of the invention encompassed by the appended claims.

What is claimed is:

1. A computer method for providing pattern specification, comprising the steps of:
    in a computer:
    defining patterns as a class in a meta model of a target domain resulting in a pattern meta-class, each pattern having one or more pattern roles representing instances of respective interfaces, the pattern roles including any of:
    a component role representing an instance of an interface in the target domain, a composite role representing an instance of a class in the target domain that implements the component interface and composes instances of that interface, a leaf role representing an instance of the target domain class that implements the component interface, and a compose role representing an instance of the target domain operation defined by the class represented by the composite role;
    defining the pattern roles as properties of the pattern meta-class resulting in meta-properties; and
    specifying constraints between pattern roles in context of the pattern meta-class.

2. A method as claimed in claim 1 wherein the target domain is a computer programming model; and
    the pattern meta-class is a meta-class in an object-oriented model.

3. A method as claimed in claim 2 wherein the step of defining pattern roles as properties of the pattern meta-class and thus meta-properties is instead of defining the pattern roles as meta-objects.

4. A method as claimed in claim 1 further comprising the step of defining relationships between pattern roles as connectors between the meta-properties.

5. A method as claimed in claim 1 further comprising the step of defining ports to the pattern meta-class in a manner enabling pattern re-use.

6. A method as claimed in claim 1 wherein the step of defining pattern roles as meta-properties includes providing to pattern roles semantics of properties, and
    further comprising the step of simplifying pattern specification by utilizing high level relationships specified between pattern roles.

7. A method as claimed in claim 1 wherein the target domain is a Unified Modeling Language 2 structure.

8. Computer apparatus for specifying patterns in a target domain, comprising:
    a processor providing a meta-class defined for patterns, the meta-class being a class in a meta model of a target domain, each pattern having one or more pattern roles representing instances of respective interfaces, the pattern roles including any of:
    a component role representing an instance of an interface in the target domain, a composite role representing an instance of a class in the target domain that implements the component interface and composes instances of that interface, a leaf role representing an instance of the target domain class that implements the component interface, and a compose role representing an instance of the target domain operation defined by the class represented by the composite role;
    the processor providing a property of the meta-class as a respective meta-property for each pattern role;
    in computer memory:
    one or more connectors between meta-properties to represent relationships between pattern roles; and
    one or more associations for representing high level relationships between pattern roles in a manner simplifying pattern specification.

9. Computer apparatus as claimed in claim 8 further comprising constraints specified between pattern roles in the context of the pattern meta-class.

10. Computer apparatus as claimed in claim 8 wherein the target domain is a computer programming model; and
    the pattern meta-class is a meta-class in an object-oriented model.

11. Computer apparatus as claimed in claim 8 further comprising ports to the pattern meta-class enabling pattern re-use.

12. Computer apparatus as claimed in claim 8 wherein the meta-properties provide to pattern roles semantics of properties.

13. Computer apparatus as claimed in claim 8 wherein the target domain is a Unified Modeling Language 2 structure.

14. A computer program product comprising:
- a computer readable storage medium having computer readable program code for specifying patterns, said computer program product including:
- computer readable program code for defining patterns as a class in a meta-model of a target domain, each pattern having one or more roles representing instances of respective interfaces, the pattern roles including any of:
- a component role representing an instance of an interface in the target domain, a composite role representing an instance of a class in the target domain that implements the component interface and composes instances of that interface, a leaf role representing an instance of the target domain class that implements the component interface, and a compose role representing an instance of the target domain operation defined by the class represented by the composite role;
- computer readable program code for modeling pattern roles as properties of the class;
- computer readable program code for modeling relationships between pattern roles, said modeling using connectors between respective properties; and
- computer readable program code for specifying and attaching constraints to pattern roles, said specifying being in context of the class.

15. A computer program product as claimed in claim 14 further comprising computer usable program code for representing high level relationships between pattern roles in a manner simplifying pattern specification.

16. A computer program product as claimed in claim 14 wherein the target domain is a computer programming model; and
the pattern class is a meta-class in an object-oriented model.

17. A computer program product as claimed in claim 16 wherein the target domain is a Unified Modeling Language 2 structure.

18. A computer system for providing pattern specification, comprising:
- a computer having means for defining patterns as a class in a meta-model of a target domain, each pattern having one or more roles representing instances of respective interfaces, the pattern roles including any of:
- a component role representing an instance of an interface in the target domain, a composite role representing an instance of a class in the target domain that implements the component interface and composes instances of that interface, a leaf role representing an instance of the target domain class that implements the component interface, and a compose role representing an instance of the target domain operation defined by the class represented by the composite role;
- processor means for modeling the pattern roles as properties of the class; and
any combination of:
- computer means for modeling relationships between pattern roles as connectors between respective properties;
- computer means for specifying constraints to pattern roles, said specifying being in context of the class; and
- computer means for representing high level relationships between pattern roles such that pattern specification is simplified.

19. A computer system as claimed in claim 18 wherein the target domain is a computer programming model; and
the pattern class is a meta-class in an object-oriented model.

20. A computer system as claimed in claim 19 wherein the target domain is a Unified Modeling Language 2 structure.

\* \* \* \* \*